US007487338B2

(12) United States Patent
Matsuo

(10) Patent No.: US 7,487,338 B2
(45) Date of Patent: Feb. 3, 2009

(54) DATA PROCESSOR FOR MODIFYING AND EXECUTING OPERATION OF INSTRUCTION CODE ACCORDING TO THE INDICATION OF OTHER INSTRUCTION CODE

(75) Inventor: Masahito Matsuo, Hyogo (JP)

(73) Assignee: Renesas Technology Corp., Chiyoda-Ku, Tokyo (JP)

( * ) Notice: Subject to any disclaimer, the term of this patent is extended or adjusted under 35 U.S.C. 154(b) by 383 days.

(21) Appl. No.: 10/443,768

(22) Filed: May 23, 2003

(65) Prior Publication Data

US 2004/0015680 A1    Jan. 22, 2004

(30) Foreign Application Priority Data

Jul. 19, 2002    (JP)    ............... 2002-211060

(51) Int. Cl.
G06F 7/38    (2006.01)
G06F 9/00    (2006.01)
G06F 9/44    (2006.01)
G06F 15/00   (2006.01)
(52) U.S. Cl. ..................................................... 712/226
(58) Field of Classification Search .................. 712/226
See application file for complete search history.

(56) References Cited

U.S. PATENT DOCUMENTS 5,706,514 A * 1/1998 Bonola ..................... 718/104
5,915,109 A * 6/1999 Nakakimura et al. ........ 712/221
5,924,114 A    7/1999 Maruyama et al.
6,240,506 B1 * 5/2001 Miller ....................... 712/213
6,684,320 B2 * 1/2004 Mohamed et al. ............ 712/24

FOREIGN PATENT DOCUMENTS

| JP | 48-14237 | 2/1973 |
| JP | 60-65342 | 4/1985 |
| JP | 3-116230 | 5/1991 |
| JP | 4-319729 | 11/1992 |
| JP | 9-231070 | 9/1997 |
| JP | 10-91430 | 4/1998 |
| JP | 2002-163104 | 6/2002 |

(Continued)

OTHER PUBLICATIONS

"TMS320C6000 CPU and Instruction Set Reference Guide," Texas Instruments, Oct. 2000, pp. 3-30-3-33, 3-105-3-107, 3-113-3-114, and 3-122-3-123.

(Continued)

*Primary Examiner*—Eddie Chan
*Assistant Examiner*—Brian P Johnson
(74) *Attorney, Agent, or Firm*—Buchanan Ingersoll & Rooney PC

(57) ABSTRACT

A MOD_SAT instruction indicating that a 16 bit saturation is to be carried out with respect to the operation of one of instructions executed in parallel is placed in the left container and an ADD instruction is placed in the right container. When the instruction decode unit decodes these instructions, the instruction decode unit indicates that the instruction execution unit executes the ADD instruction accompanying a saturation process. Accordingly, the operation of a great number of instructions can be modified by combining instructions and, therefore, the basic instruction length can be made short and it becomes possible to increase the code efficiency.

5 Claims, 27 Drawing Sheets

FOREIGN PATENT DOCUMENTS

WO      WO98/33115      7/1998

OTHER PUBLICATIONS

"Intel Architecture Software Developer's Manual," vol. 1, pp. 3-5, 3-14-3-15, vol. 2, pp. 2-1-2-2, Intel Corporation 1997.

Japanese Office Action dated Mar. 28, 2006 with English-language translation.

Japanese Office Action, with English-language translation, mailed Jun. 20, 2006.

\* cited by examiner

FIG.2
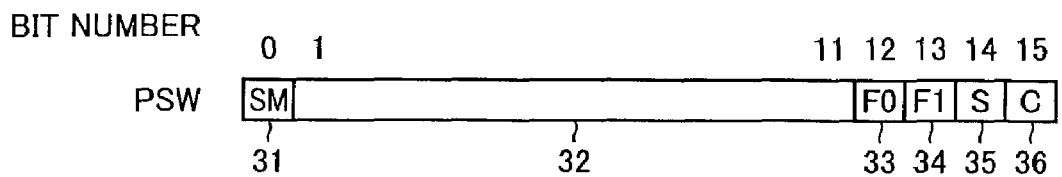
FIG.3
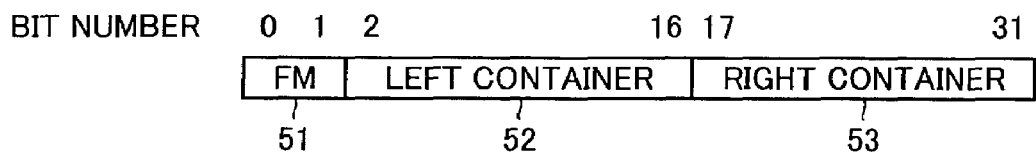
FIG.4
| FM | FORMAT | INSTRUCTION EXECUTION ORDER | | |
|---|---|---|---|---|
| | | | LEFT CONTAINER | RIGHT CONTAINER |
| 00 | SHORT x 2 | PARALLEL | FIRST | FIRST |
| 01 | SHORT x 2 | SEQUENTIAL | FIRST | SECOND |
| 10 | SHORT x 2 | SEQUENTIAL | SECOND | FIRST |
| 11 | LONG x 1 | — | FIRST | |

IA: INSTRUCTION ADDRESS
ID: INSTRUCTION DATA (INSTRUCTION CODE)
OA: OPERAND ADDRESS
OD: OPERAND DATA

FIG.11

BIT NUMBER

| | 0 | 5 | 6 | 9 | 10 | 13 | 14 |

MOD_SAT     | 101111 | 0001 | 0000 | 0 |

FIG.12

BIT NUMBER

| | 0 | 5 | 6 | 9 | 10 | 13 | 14 |

MOD_SATB    | 101111 | 0001 | 0001 | 0 |

FIG.13

BIT NUMBER

| | 0 | 5 | 6 | 9 | 10 | 13 | 14 |

MOD_SATN    | 101111 | 0010 | 0000 | 0 |

FIG.14

BIT NUMBER

| | 0 | 5 | 6 | 9 | 10 | 13 | 14 |

MOD_SATX    | 101111 | 0011 | 0000 | 0 |

FIG.15

BIT NUMBER

| | 0 | 5 | 6 | 9 | 10 | 13 | 14 |

ADD Rdest,Rsrc  | 000001 | Rdest | Rsrc | 0 |

FIG.17

|  | BEFORE EXECUTION | AFTER EXECUTION |
|---|---|---|
| R0 | 0x7000 | 0x9000 |
| R2 | 0x2000 | 0x2000 |
| S | 0 | 0 |

FIG.18

|  | BEFORE EXECUTION | AFTER EXECUTION |
|---|---|---|
| R0 | 0x9000 | 0x5000 |
| R2 | 0xc000 | 0xc000 |
| S | 0 | 0 |

FIG.21

|  | BEFORE EXECUTION | AFTER EXECUTION |
|---|---|---|
| R0 | 0x7000 | 0x7fff |
| R2 | 0x2000 | 0x2000 |
| S | 0 | 1 |

FIG.22

|  | BEFORE EXECUTION | AFTER EXECUTION |
|---|---|---|
| R0 | 0x9000 | 0x8000 |
| R2 | 0xc000 | 0xc000 |
| S | 0 | 1 |

FIG.23

BIT NUMBER

| | 0 | 5 | 6 | 9 | 10 | 13 | 14 |

SLLI Rdest,#imm4 | 010001 | Rdest | imm4 | 1 |

FIG.27

BIT NUMBER

| | 0 | 5 | 6 | 9 | 10 | 13 | 14 |
|---|---|---|---|---|---|---|---|
| STB Rsrc1,@Rsrc2 | 111100 | | Rsrc1 | | Rsrc2 | | 0 |

ADD3 Rdest,Rsrc,#imm16

FIG.32

BIT NUMBER

| | 0 | 5 | 6 | 9 | 10 | 13 | 14 |

MOD_2B | 101111 | 0101 | 0000 | 0 |

FIG.35

|  | BEFORE EXECUTION | AFTER EXECUTION |
|---|---|---|
| R0 | 0x0001 | 0xffff |
| R2 | 0x0102 | 0x0102 |

FIG.36

|  | BEFORE EXECUTION | AFTER EXECUTION |
|---|---|---|
| R0 | 0x0001 | 0xfeff |
| R2 | 0x0102 | 0x0102 |

FIG.38

BIT NUMBER

```
              0        3                        12 13 14 15
PREFIX     | 0001  |  0000  |  0000  |S1|S2|S3|0|
              |                                 |   |
             511                               512 514
                                                513
```

IA: INSTRUCTION ADDRESS
ID: INSTRUCTION DATA (INSTRUCTION CODE)
OA: OPERAND ADDRESS
OD: OPERAND DATA

DATA PROCESSOR FOR MODIFYING AND EXECUTING OPERATION OF INSTRUCTION CODE ACCORDING TO THE INDICATION OF OTHER INSTRUCTION CODE

BACKGROUND OF THE INVENTION

1. Field of the Invention

The present invention relates to a data processor for fetching and sequentially executing an instruction code, and more particularly to a data processor having a function of modifying the content of the operation of an instruction which is executable alone.

2. Description of the Background Art

In recent years the performance of applications has been enhanced and the number of functions of applications has increased and, at the same time, the number of types of instructions required for a data processor, such as a microprocessor, has also increased. In general, selection of instructions is carried out taking the target application, cost and the like into consideration at the time the instruction set is determined when designing a data processor.

It is important to increase the code efficiency in order to, for example, lower product cost. In a data processor built into an equipment wherein a program is written into a ROM (Read Only Memory), the size of the program is a significant factor in determining product cost and, therefore, it is particularly important to increase code efficiency.

An increase in code efficiency is achieved by selecting instructions having a high frequency of execution and by implementing these instructions as instructions of smaller code sizes. When, in order to make the basic instruction length shorter, the number of instructions is too greatly reduced, however, the desired function or performance cannot be obtained. In addition, in some cases, on contrary, the number of instructions necessary for implementation of a predetermined process increases, which results in an increase in the code size.

On the other hand, in the case of the development of a specific data processor having a certain degree of versatility, it is necessary to implement instructions utilized in the target application in the data processor in order to efficiently process this application. In order to efficiently cope with multimedia processing, instructions including a product-sum operation instruction are, for example, added. There is a tradeoff between reduction in cost as a result of increase in code efficiency and the addition of instructions for the enhancement of performance.

In a data processor for carrying out a signal process, for example, a saturation operation is frequency used. In the case that an overflow generates when a saturation operation is carried out a maximum value is set as a result of the operation and in the case that an underflow generates when a saturation operation is carried out a minimum value is set as a result of the operation, thereby it becomes possible to prevent the result of the operation from being converted from the maximum value to the minimum value or from the minimum value to the maximum value.

However, there are many operation instructions that must be implemented as saturation operations, such as addition and subtraction, sign change, calculation of the absolute value, shift and the like. In addition, for each of these operations the operand may be given as the immediate data or the operand may be stored in a register, an accumulator or a memory and, therefore, many instructions must be provided according to the types of operands.

Thus, in the case that an instruction with a saturation operation function and an instruction without a saturation operation function are both provided, the number of instructions that are implemented increase and the bit width necessary for the instructions increases so that the code efficiency is decreased. In particular, in a versatile data processor, the size of an instruction is, at least, a byte (eight bit) unit. Furthermore, many data processors adopt an instruction set of 16/32/64 bit units in order to simplify hardware control, in order to increase the operational frequency and in order to achieve enhancement of performance. Accordingly, restrictions in respect to instruction allocation become great and it becomes difficult to allocate many instructions with instructions of a short length so that reduction of costs becomes difficult.

In order to solve such a problem, a data processor has been developed that is provided with a function of designating an operation mode and that can execute different operation contents depending on the operation mode even for the same instruction code. However, saturation operation is not, in general, carried out in an address calculation or the like. In the case that the same instructions are utilized for address calculation and for a data operation, and a saturation operation is required in the data operation, it becomes necessary to frequently carry out change of the mode setting. Accordingly, in such a case, the overhead required for change of the mode setting becomes great and the performance may significantly deteriorate.

In addition, the content of the operation is not determined by the instruction codes alone and, therefore, debugging of the program becomes difficult and the possibility of bugs becoming incorporated in the program becomes high. In the case that the same process is converted into subroutines, for example, different mode settings when calling out such subroutines lead to different operational contents of the subroutines due the status thereof and, thereby, a problem may arise causing a malfunction.

As described above, in the data processor according to a prior art, a great number of independent operation instructions are attempted to be implemented in order to increase performance, resulting in a long basic instruction length and, therefore, a problem arises wherein the code efficiency is decreased leading to higher product costs.

In addition, in the case that different operations are executed using the same instruction according to the mode setting, the debugging of a program becomes difficult causing a problem wherein the possibility of the incorporation of bugs in a program is increased and wherein the overhead accompanying change in the mode setting becomes great, so that processing performance is lowered.

SUMMARY OF THE INVENTION

An object of the present invention is to provide a data processor wherein the basic instruction length can be made short so as to increase the code efficiency while implementing a large number of executable instructions.

Another object of the present invention is to provide a data processor wherein debugging of software is easy and bugs in the software are prevented.

According to one aspect of the present invention, a data processor includes: an instruction fetch unit fetching an instruction code; an instruction decode unit decoding the instruction code fetched by the instruction fetch unit; an instruction execution unit executing an instruction in response to the result of decoding by the instruction decode unit; and a circuit, in the case that the instruction code indicates a modification of operations of a plurality of other instruction codes, modifying the operations and allowing the instruction execution unit to execute the modified operations of the plurality of other instruction codes.

Since the circuit modifies the operation of the plurality of other instruction codes, the operations of many instructions can be modified by combining instructions so that the basic instruction length can be made short and it becomes possible to increase the code efficiency. In addition, the content of the operations is determined solely by the instruction codes and, therefore, debugging of software becomes easy and it becomes possible to prevent software bugs. Furthermore, one instruction code modifies the operations of a plurality of other instruction codes and, therefore, further increase in the code efficiency becomes possible.

According to another aspect of the present invention, a data processor includes: an instruction fetch unit fetching an instruction code; an instruction decode unit decoding the instruction code fetched by the instruction fetch unit; an instruction execution unit executing an instruction in response to the result of decoding by the instruction decode unit; and a circuit, in the case that the instruction code indicates a modification of an operation of an instruction code of the next instruction, modifying the operation and allowing the instruction execution unit to execute the modified operation of the instruction code of said next instruction.

Since the circuit modifies the operation of the instruction code of the next instruction, the operations of a great number of instructions can be modified by combining instructions and, therefore, it becomes possible to obtain substantially the same effects as of increasing the number of instructions that are implemented.

According to still another aspect of the present invention, a data processor executing an instruction including a first operation code and a second operation code, includes: an instruction fetch unit fetching an instruction code; an instruction decode unit decoding an instruction code that has been fetched by the instruction fetch unit; and an instruction execution unit for executing the instruction in response to the result of decoding by the instruction decode unit, wherein the instruction decode unit includes: a first decoder decoding the first operation code; and a second decoder decoding the second operation code, the instruction execution unit includes: a first instruction execution unit executing the first operation code in response to the result of decoding by the first decoder; and a second operation execution unit executing the second operation code in response to the result of decoding by the second decoder, and the data processor further includes a circuit, in the case that the second operation code indicates a modification of an operation indicated by the first operation code, allowing the first instruction execution unit to execute a modified operation indicated by the first operation code.

Accordingly, it becomes possible for the first instruction execution unit to execute an operation of an instruction that has not been implemented.

According to yet another aspect of the present invention, a data processor includes: an instruction fetch unit fetching an instruction code; an instruction decode unit decoding an instruction code fetched by the instruction fetch unit; and an instruction execution unit executing the instruction in response to the result of decoding by the instruction decode unit, wherein at the time of processing a first instruction including a first instruction code and a second instruction code wherein parallel execution is defined as an instruction, and a second instruction including one or a plurality of instruction codes to be executed after the first instruction, and the data processor further includes a circuit allowing the instruction execution unit to execute modified operations of the second instruction code and the one or plurality of instruction codes included in the second instruction in the case that the first instruction code indicates modifications of operations of the second instruction code and of the one or plurality of instruction codes included in the second instruction.

Accordingly, the operations of the second instruction code included in the first instruction and the operations of the one or the plurality of instruction codes included in the next instruction can be modified so that it becomes possible to further increase the code efficiency.

According to yet another aspect of the present invention, a data processor executing an instruction including a plurality of operation codes and an instruction prefix word designating the modification of the operation indicated by the plurality of operation codes, includes: an instruction fetch unit fetching an instruction code; an instruction decode unit decoding an instruction code fetched by the instruction fetch unit; and an instruction execution unit executing the instruction in response to the result of decoding by the instruction decode unit, wherein the instruction decode unit includes a plurality of decoders decoding the plurality of operation codes, the instruction execution unit includes a plurality of instruction execution units executing the operation indicated by the plurality of operation codes in response to the results of decoding obtained by the plurality of decoders, and the data processor further includes a circuit determining whether or not each operation designated by the corresponding operation code is to be modified in response to the instruction prefix word and allowing the corresponding instruction execution unit to execute the corresponding operation.

Since operations indicated by a plurality of operation codes can be modified by an instruction prefix word, the basic instruction length can be made short and it becomes possible to increase the code efficiency.

According to yet another aspect of the present invention, a data processor includes: an instruction fetch unit fetching an instruction code; an instruction decode unit for decoding an instruction code fetched by the instruction fetch unit; an instruction execution unit executing the instruction in response to the result of decoding by the instruction decode unit; and a circuit allowing the instruction execution unit to execute the operation with respect to a plurality of pieces of data designated by the other instruction code in the case that an instruction code indicates that a modification of an operation of other instruction code is to be modified.

Since a circuit allowing the instruction execution unit to execute the operation with respect to a plurality of pieces of data designated by other instruction code is included, the operation of many instructions can be modified by combining instructions so that the basic instruction length can be made short and it becomes possible to increase the code efficiency. In addition, the content of the operation is determined by an instruction code alone and, therefore, debugging of software is easy and it becomes possible to prevent software bugs. Furthermore, the operation is modified so as to be executed with respect to a plurality of pieces of data with one instruction code and, therefore, it becomes possible to further increase the code efficiency.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a diagram for describing PSW18 in detail;

FIG. 3 is a diagram for describing an instruction format for the data processor according to the first embodiment of the present invention;

FIG. 4 is a diagram for describing the content of FM bit 51;

FIG. 11 is a diagram for describing bit allocation of operation modifying instruction MOD_SAT;

FIG. 12 is a diagram for describing bit allocation of operation modifying instruction MOD_SATB;

FIG. 13 is a diagram for describing bit allocation of operation modifying instruction MOD_SATN;

FIG. 14 is a diagram for describing bit allocation of operation modifying instruction MOD_SATX;

FIG. 15 is a diagram for describing bit allocation of an ADD instruction for carrying out a 16 bit addition between registers;

FIG. 17 is a diagram showing register values and S flag values before and after the operation in the case that "ADD R0, R2" is solely executed and an overflow occurs;

FIG. 18 is a diagram showing register values and S flag values before and after the operation in the case that "ADD R0, R2" is solely executed and an underflow occurs;

FIG. 21 is a diagram showing register values and S flag values before and after the operation in the case that an instruction "ADD R0, R2", of which the operation is modified, is executed and an overflow occurs;

FIG. 22 is a diagram showing register values and S flag values before and after the operation in the case that an instruction "ADD R0, R2", of which the operation is modified, is executed and an underflow occurs;

FIG. 23 is a diagram for describing bit allocation of a left shift instruction SLLI, of which the amount of shift is designated by immediate data of 4 bits;

FIG. 27 is a diagram showing instruction bit allocation of a byte store (STB) instruction in a register indirect mode;

FIG. 32 is a diagram showing instruction bit allocation of a MOD_2B instruction for indicating that two eight bit operations are executed in parallel with respect to the operation of a pair of instructions executed in parallel;

FIG. 35 is a diagram showing one example of the result of a subtraction process of two pieces of byte data;

FIG. 36 is a diagram for describing an operation process in the case that a subtraction process of 16 bit data having the same initial value as in FIG. 35 is carried out;

FIG. 38 is a diagram for describing prefix word 501 shown in FIG. 37 in detail.

DESCRIPTION OF THE PREFERRED EMBODIMENTS

First Embodiment

According to the first embodiment of the present invention, though the case wherein the data processor is a 16 bit processor and the bit length of addresses and data is 16 bits is described, the data processor can be applied in the case of bit length of addresses and data of 32 bits or 64 bits.

Figure 1:
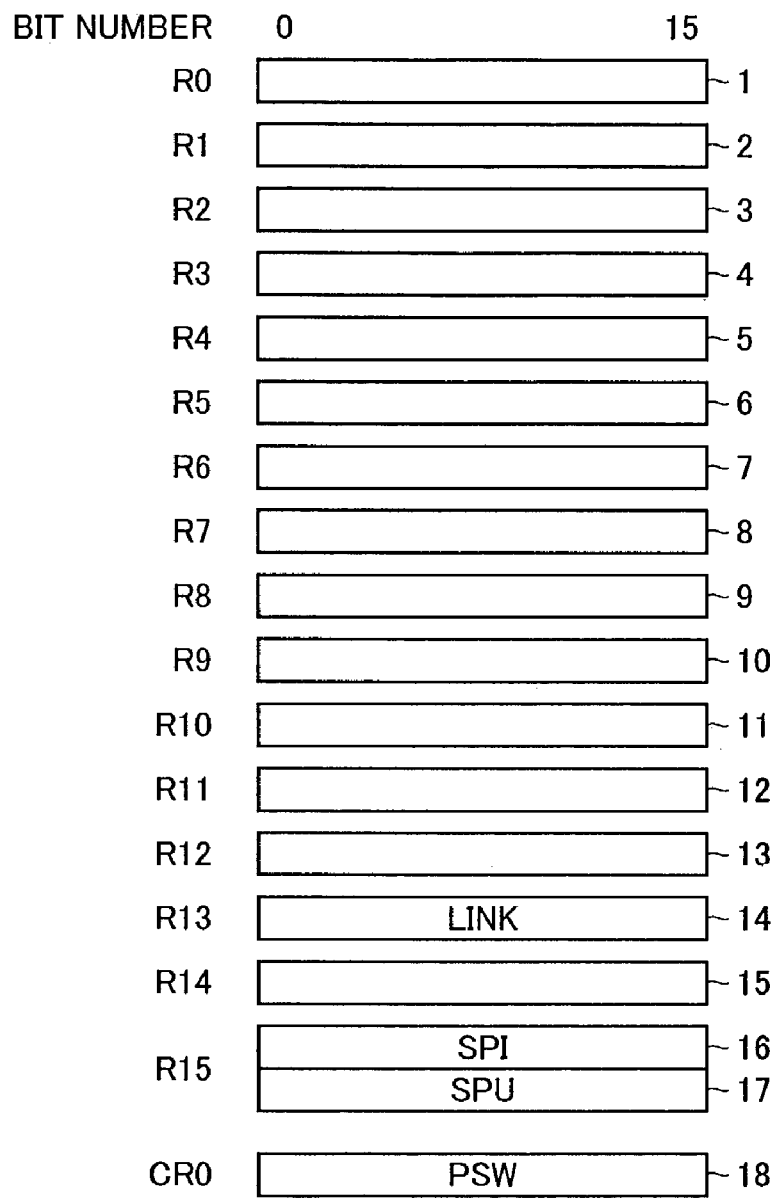
FIG. 1 is a diagram for describing the register set in a data processor according to the first embodiment of the present invention.
Figure 1:
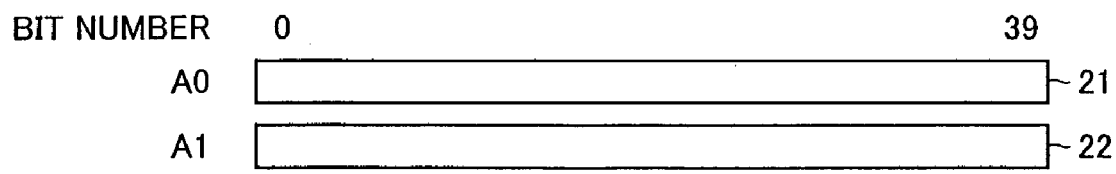

FIG. 1 is a diagram for describing the register set of the data processor according to the first embodiment of the present invention. The big endian system is adopted with respect to bit order and byte order in this data processor and the MSB (most significant bit) becomes bit 0 in the bit position.

Sixteen general purpose registers R0 (1) to R15 (16, 17) store data and address values. Register R13 (14) is allocated as a link register for storing a return address at the time of subroutine jump. Register R15 (16, 17) is a stack pointer (SP) and includes a stack pointer SPI 16 for interrupt and a stack pointer SPU 17 for user. These registers are switched by means of a stack mode bit within the below described processor status word (PSW) 18. Hereinafter, SPI 16 and SPU 17 are generically referred to as a stack pointer (SP). Here, the number of the register that becomes an operand is designated in a register designation field of 4 bits, except for special cases.

In addition, the data processor according to the present embodiment is provided with control registers such as PSW (CR0) 18 and a program counter (PC) (not shown). These control registers have the register numbers indicated by 4 bits in the same manner as general purpose registers. Here, these registers do not directly relate to the present invention and, therefore, detailed descriptions thereof are omitted.

Registers A0 (21) and A1 (22) indicate accumulators of 40 bits.

FIG. 2 is a diagram for describing PSW18 in detail. This PSW18 includes a stack mode (SM) bit 31 indicating the selection of either stack pointer SPI 16 for interrupt or stack pointer SPU 17 for user, as well as F0 flag 33, F1 flag 34, saturation (S) flag 35 and carry (C) flag 36 which are conditional flags set by a comparison instruction, or the like, and are referred to as conditions of conditional branch instructions, or the like. Other flags such as status flags and mode bit 32 do not directly relate to the present invention and, therefore, detailed descriptions thereof are omitted.

FIG. 3 is a diagram for describing an instruction format of the data processor according to the present embodiment. The data processor according to the present embodiment processes two way VLIW (very long instruction word) instruction sets. The basic instruction length is fixed at 32 bits and is aligned within the 32 bit borders. The PC value is controlled by the instruction word address of 32 bits.

As shown in FIG. 3, an instruction code of 32 bits is formed of a format designation (FM) bit 51 of 2 bits indicating the format of the instruction, a left container 52 of 15 bits and a right container 53 of 15 bits. Left container 52 and right container 53, respectively, can store subinstructions in short formats of 15 bits and in addition, the two containers together can store a subinstruction in a long format of 30 bits. Hereinafter, for the purpose of simplification a subinstruction in the short format is referred to as short instruction and a subinstruction in the long format is referred to as long instruction.

FIG. 4 is a diagram for describing the content of FM bit 51. FM bit 51 designates the format of the instructions and execution order of the two short instructions. In the instruction execution order "first" indicates the instruction to be executed first and "second" indicates the instruction to be executed afterwards. In the case that FM bit 51 is "11", this indicates that left container 52 and right container 53 hold one long instruction of 30 bits. Other cases indicate that left container 52 and right container 53, respectively, hold short instructions.

In the case that FM bit 51 is "00", this indicates that two short instructions are executed in parallel. In addition, in the case that the FM bit 51 is "01", the short instruction held in right container 53 is executed after the short instruction held in left container 52 is executed. In addition, in the case that FM bit 51 is "10", this indicates that the short instruction held in left container 52 is executed after the short instruction held in right container 53 is executed. Thus, two short instructions to be sequentially executed can be encoded as one 32 bit instruction and, thereby, an increase in the code efficiency is achieved.

Figure 5:
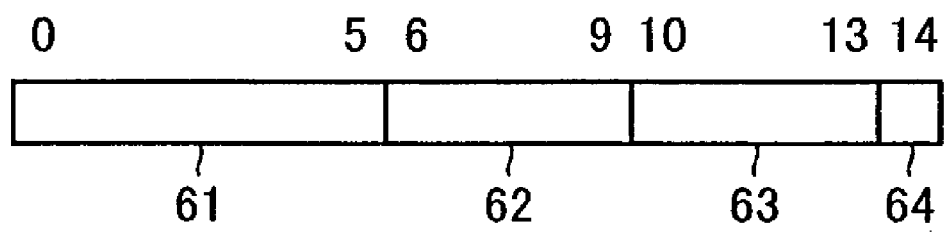
FIG. 5 is a diagram showing bit allocation of a short instruction having two operands.
Figure 6:
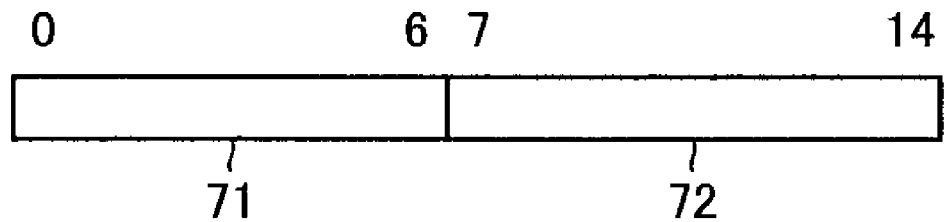
FIG. 6 is a diagram showing bit allocation of a branch instruction in the short format.
Figure 7:
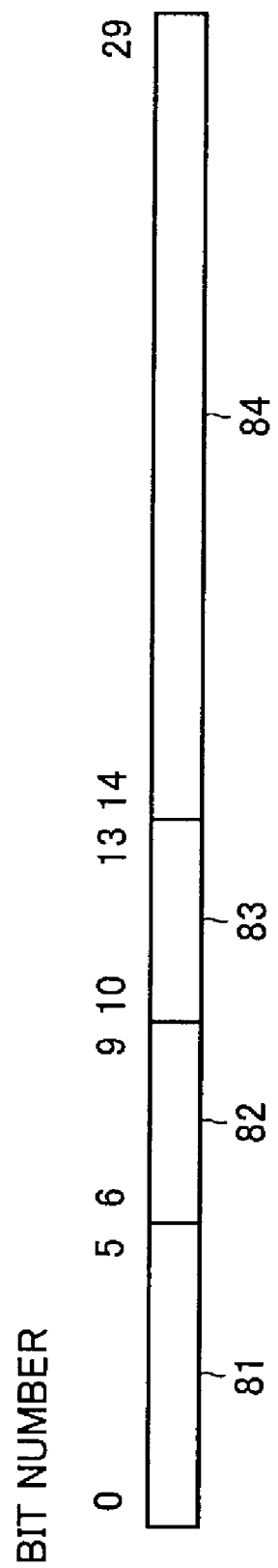
FIG. 7 is a diagram showing bit allocation of a three operand instruction or a load/store instruction having displacement or immediate data of 16 bits.

FIGS. 5 to 7 are diagrams showing examples of typical bit allocations of an instruction for the data processor according to the present embodiment. FIG. 5 shows bit allocation of a short instruction having two operands. Fields 61 and 64 are operation code fields. In addition, the accumulator number is, in some cases, designated by field 64.

Fields 62 and 63 designate the storage position of data that is referred to, or is updated, as an operand with a register number or an accumulator number. In addition, field 63 may, in some cases, designate immediate data of 4 bits.

FIG. 6 shows bit allocation of a branch instruction in the short format. This instruction format is formed of an operation code field 71 of seven bits and a branch displacement field 72 of eight bits. The branch displacement is designated by an offset from this instruction word (32 bits) in the same manner as the PC value.

FIG. 7 shows bit allocation of a three operand instruction or a load/store instruction having a displacement or immediate data of 16 bits. This instruction format is formed of an operation code field 81, fields 82 and 83 that designate register numbers, or the like, in the same manner as the short format and an expansion data field 84 that designates a displacement, immediate data, or the like, of 16 bits.

In addition to the above described instruction format, an instruction, such as a NOP (no operation) instruction, wherein the entirety of 15 bits is an operation code and an instruction, such as a 1 operand instruction, having a special bit allocation exist.

The respective subinstructions implemented in the data processor according to the present embodiment form a RISC (reduced instruction set computer)-like instruction set. Instructions that access memories are load/store instructions alone. Operation instructions carry out operations corresponding to operands or immediate operands stored in a register or in an accumulator.

Addressing modes of accesses to operand data have five types, a register indirect mode, a register indirect mode with a post increment, a register indirect mode with a post decrement, a push mode and a register relative indirect mode. These five types of mnemonics are, respectively, indicated by "@Rsrc", "@Rsrc+", "@Rsrc−", "@−SP" and "@(disp 16, Rsrc)." "Rsrc" indicates the register number designating the base address and "disp 16" indicates the displacement value of 16 bits. Here, the addresses of operands are designated by byte addresses.

Load/store instructions other than of the register relative indirect mode have the instruction format shown in FIG. 5. That is to say, the base register number is designated by field 63 and the number of the register in which a value loaded from a memory is written or the number of the register in which the value stored in the memory is held is designated by field 62.

In the register indirect mode, the value of the register designated as the base register becomes the operand address.

In the register indirect mode with a post increment, the value of the register designated as the base register becomes the operand address and the value of this base register is increased by the size (number of bytes) of the operand as a post increment and is written back into the register.

In the register indirect mode with a post decrement, the value of the register designated as the base register becomes the operand address and the value of this base register is decreased by the size (number of bytes) of the operand as a post decrement and is written back into the register.

The push mode is a store instruction and can be utilized only in the case that the base register is R15 (SP) wherein the SP value is decreased by the size (number of bytes) of the operand as a post decrement so as to become the operand address and this reduced value by a decrement is written back into the SP.

The format of load/store instructions in the register relative indirect mode is the instruction format shown in FIG. 7. The number of the base register is designated by field 83 and the number of the register in which the value loaded from a memory is written or the number of the register that holds the value stored in a memory is designated by field 82. In addition, the displacement value from the base address is designated by field 84. In this register relative indirect mode, the displacement value of 16 bits is added to the value of the register designated as the base register so that the operand address is obtained.

Jump address designation of a jump instruction includes a register indirect mode wherein the jump address is designated by the value stored in a register and a PC relative indirect mode wherein the jump address is designated by the branch displacement from the PC value. This PC relative indirect mode includes two types, a short format wherein the branch displacement is designated with eight bits and a long format wherein the branch displacement is designated with 16 bits.

Figure 8:
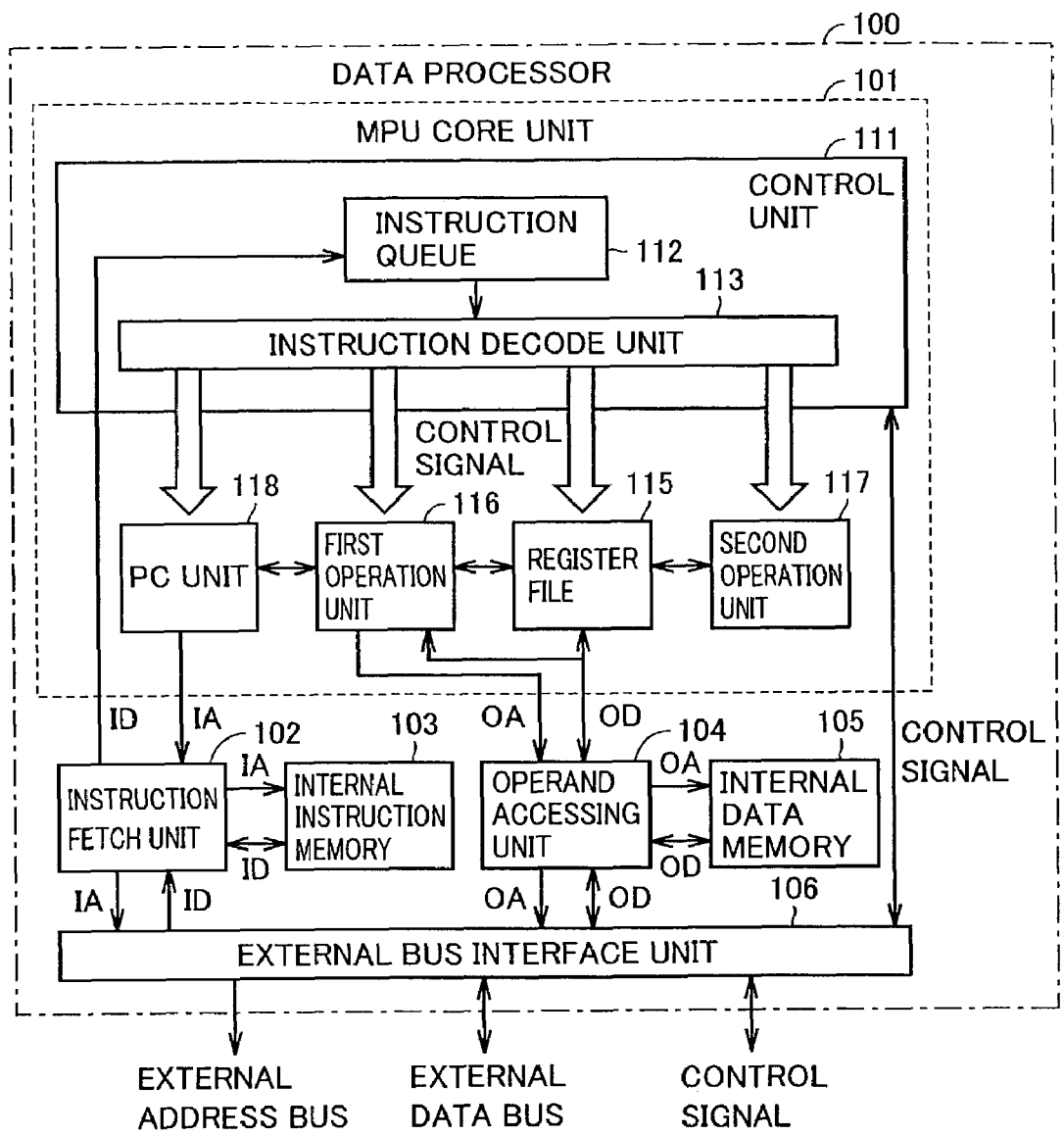
FIG. 8 is a block diagram showing a schematic configuration of the data processor according to the first embodiment of the present invention.

FIG. 8 is a block diagram showing a schematic configuration of a data processor according to the first embodiment of the present invention. This data processor 100 includes an MPU (micro processing unit) core unit 101, an instruction fetch unit 102 for fetching instruction data in response to a request from MPU core unit 101, an internal instruction memory 103, an operand access unit 104 for accessing operand data in response to a request from MPU core unit 101, an internal data memory 105 and an external bus interface unit 106 for arbitrating a request from instruction fetch unit 102 and operand access unit 104 in order to access a memory outside of data processor 100.

In addition, MPU core unit 101 includes a control unit 111 for overall control of MPU core unit 101, a register file 115, a first operation unit 116, a second operation unit 117 and a PC unit 118 for controlling the PC value. Furthermore, control unit 111 includes an instruction queue 112 and an instruction decode unit 113.

Instruction queue 112 is formed of a 32 bit instruction buffer of two entries, effective bits thereof, an input/output pointer and the like, and is controlled according to a FIFO (first-in first-out) system. Instruction queue 112 temporarily holds instruction data fetched by instruction fetch unit 102 and transfers this instruction data to instruction decode unit 113. Instruction decode unit 113 decodes the instruction data to be executed and generates a control signal necessary for the execution of instructions.

Figure 9:
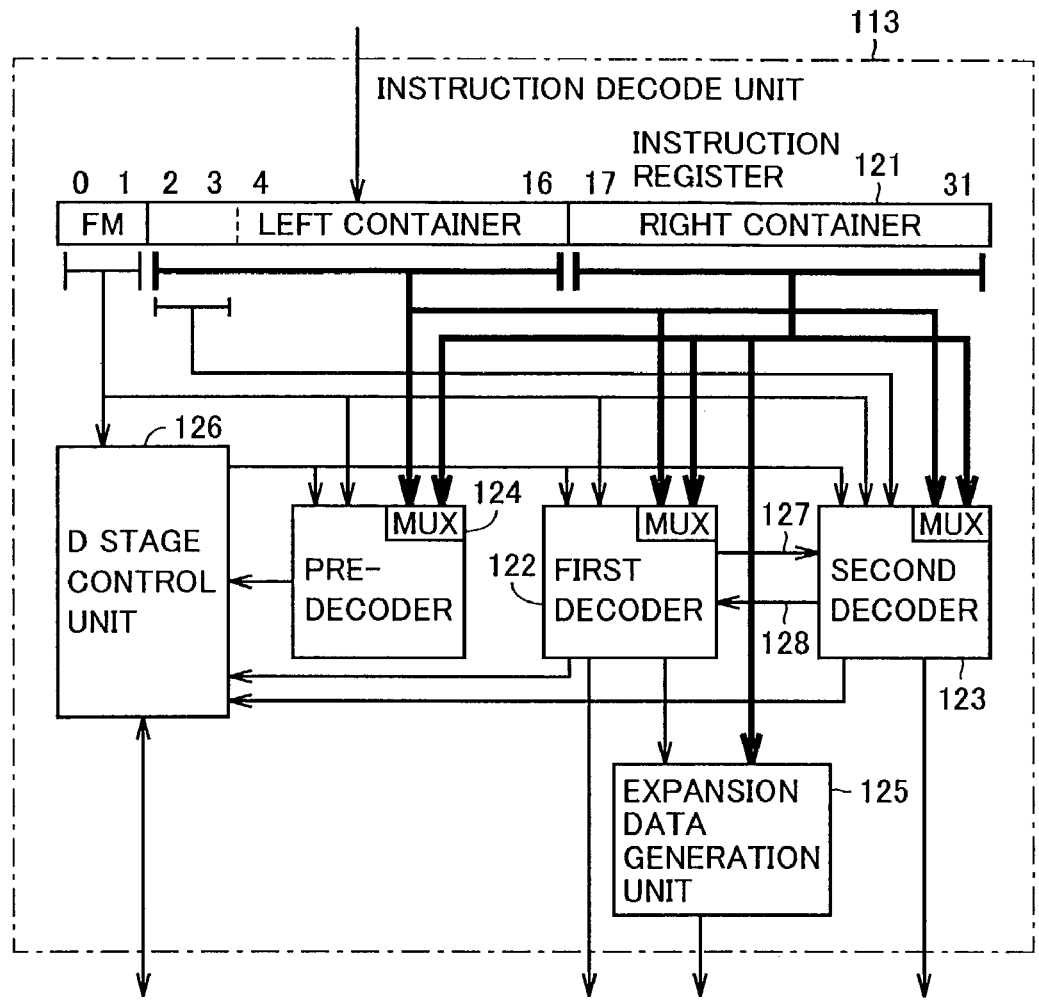
FIG. 9 is a block diagram for describing instruction decode unit 113 in further detail.

FIG. 9 is a block diagram for describing instruction decode unit 113 in further detail. The block diagram shown in FIG. 9 shows only the connection relationships required for description of the data processor according to the present embodiment and does not illustrate portions not relating to this description.

This instruction decode unit 113 includes an instruction register 121 for holding instruction data received from instruction queue 112, a first decoder 122, a second decoder 123, a pre-decoder 124, an expansion data generation unit 125 and a D stage control unit 126.

Instruction register 121 holds instruction data that is the object of decoding received from instruction queue 112. Here, the format of the instruction data held in this instruction register 121 is the same as the instruction format shown in FIG. 3.

Instruction decode unit 113 is provided with two decoders (first decoder 122 and second decoder 123) for generating an execution control signal, or the like, and it is possible to decode two short instructions in parallel.

First decoder 122 decodes the instruction to be executed by first operation unit 116 and generates an instruction execution control signal primarily for first operation unit 116, PC unit 118 and register file 115, a control signal relating to branch/jump/operand access and the like.

Second decoder 123 decodes the instruction to be executed by second operation unit 117 and generates an instruction execution control signal primarily for second operation unit 117 and register file 115.

Pre-decoder 124 decodes the short instruction to be executed later while executing the short instruction in advance in the case that the two short instructions are sequentially executed in order to determine which of first decoder 122 or second decoder 123 carries out decoding of the subsequent instruction after the execution of the previous instruction.

Here, first decoder 122, second decoder 123 and pre-decoder 124, respectively, have multiplexers (MUX) and it is possible to selectively input either the short instruction held in left container 52 or the short instruction held in right container 53.

Expansion data generation unit 125 receives the decoding result from first decoder 122 and slices expansion data such as immediate data or the displacement necessary for instruction execution in first operation unit 116. In order to slice expansion data of an instruction in the long format, data stored in night container 53 is transferred to expansion data generation unit 125. Here, the part that generates immediate data, displacement and the like required for instruction execution in second operation unit 117 is included in second decoder 123 as illustrated.

D stage control unit 126 carries out status control of instruction decoding in the instruction decode stage (D stage) described below. Here, though D stage control unit 126 need not be included in instruction decode unit 113, it is included in instruction decode unit 113 to describe the present embodiment because the analysis of instructions is involved.

In the first cycle of decoding a 32 bit instruction, the instruction code stored in left container 52 is always analyzed in first decoder 122 and the instruction code stored in right container 53 is always analyzed in second decoder 123. Here, FM bit 51 as well as bit 0 and bit 1 of left container 52 are analyzed by both decoders. Accordingly, the instruction to be executed first must be placed in a position corresponding to the operation unit that executes this instruction.

In the case that two short instructions are sequentially executed, after the earlier decoding of the short instruction according to the decoding result in pre-decoder 124, the short instruction that is to be carried out later is fetched into the decoder that is to carry out decoding and is analyzed. In the case that the short instruction that is executed later is an instruction that can be processed by either decoder, first decoder 122 decodes this short instruction.

Register file 115 corresponds to general purpose registers R0 to R15 (1 to 17), shown in FIG. 1, and holds the address value and data that become the object of processing. This register file 115 is connected to first operation unit 116, second operation unit 117, PC unit 118 and operand access unit 104 through a plurality of buses. At the time of word/two word load instruction execution, the load data is directly fetched into register file 115 from operand access unit 104.

First operation unit 116 primarily executes load/store instructions, branch instructions, arithmetic operation instructions, logic operation instructions, comparison instructions, transfer instructions and the like. This first operation unit 116 is connected to register file 115, PC unit 118 and operand access unit 104 through a plurality of buses and transfer of data or addresses required for execution of instructions is carried out between first operation unit 116, and register file 115, PC unit 118 and operand access unit 104. In addition, first operation unit 116 fetches expansion data, such as immediate data or the displacement, required for the operation from expansion data generation unit 125.

In addition, first operation unit 116 is provided with an ALU (Arithmetic and Logic Unit) (not shown) and carries out transfer, comparison, arithmetic operations, logic operations, calculation/transfer of operand addresses, increment/decrement of operand address values, calculation/transfer of jump destination addresses and the like. First operation unit 116 writes back the operation results or the results of address update in the register within register file 115 that has been designated by the instruction via a bus.

First operation unit 116 outputs the calculated operand address to operand access unit 104 at the time of execution of a load/store instruction. In addition, first operation unit 116 outputs a jump destination address to PC unit 118 at the time of execution of a jump/branch instruction.

First operation unit 116 outputs store data read out from register file 115 to operand access unit 104 after first operation unit 116 holds/aligns store data read out from register file 115 at the time of execution of a store instruction. In addition, first operation unit 116 carries out a byte alignment and a zero/sign expansion on load data fetched from operand access unit 104 and outputs the result to register file 115 at the time of byte loading.

PC unit 118 is provided with an arithmetic unit such as an incrementor, a latch and the like, and carries out management/updating of instruction fetch address and management/updating of the execution instruction PC value in synchronization with the pipeline processing of instructions upon a control of control of control unit 111. In the case that process sequences of instructions including the switching immediately after resetting are switched, PC unit 118 fetches the jump destination address from first operation unit 116 so that the values of a variety of address latches within PC unit 118 are initialized.

PC unit 118 outputs the address of the instruction to be fetched next to instruction fetch unit 102 at the time of instruction fetching. In addition, PC unit 118 outputs the address of a branch instruction required for the calculation for a branch destination address to first operation unit 116 at the time of processing of a branch instruction. In addition, PC unit 118 outputs the address of the instruction succeeding to subroutine jump/branch instruction to register file 115 as a return address in the case of a subroutine jump/branch instruction.

Second operation unit 117 primarily carries out processing, such as arithmetic operations, including product-sum operation, shift processing, bit manipulation, comparison and transfer. Second operation unit 117 is connected to register file 115 via a plurality of buses, reads out reference operand data from register file 115 and outputs write-in operand data to register file 115.

Second operation unit 117 includes a 40 bit ALU, a 40 bit barrel shifter, a 17 bit×17 bit multiplier, an arithmetic unit such as a priority encoder and two 40 bit accumulators 31 and 32 shown in FIG. 1.

Figure 10:
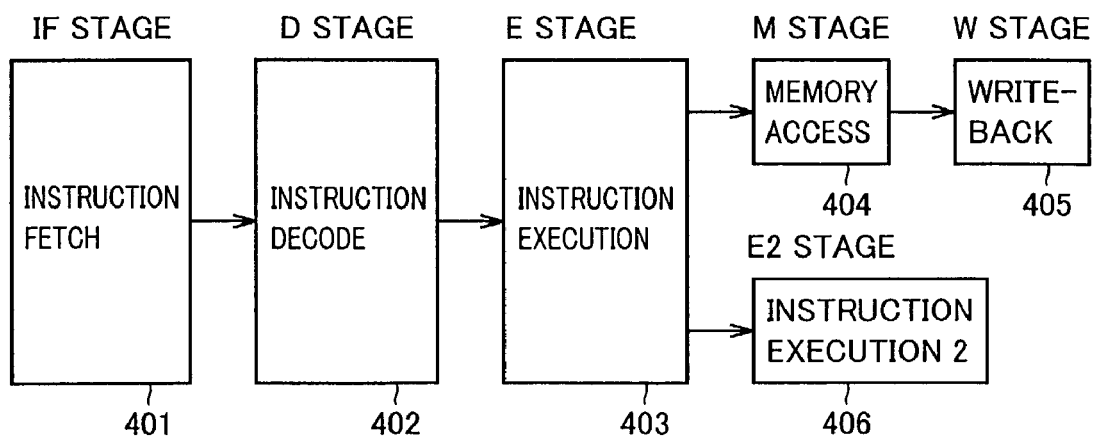
FIG. 10 is a diagram for describing pipeline processing of data processor 100 according to the first embodiment of the present invention.

FIG. 10 is a diagram for describing the pipeline processing of data processor 100 according to the first embodiment of the present invention. Data processor 100 carries out five stages of pipeline processing, instruction fetch (IF) stage 401 for fetching instruction data, instruction decode (D) stage 402 for analyzing an instruction, an instruction execution (E) stage 403 for executing an operation, a memory access (M) stage 404 for accessing a data memory and write-back (W) stage 405 for writing a byte operand loaded from a memory in a register.

Write-in of the operation result in E stage 403 to a register is completed in E stage 403. In addition, write-in of data to a register at the time of loading of word (two bytes) or two words (four bytes) is completed in M stage 404. As for a product-sum/product-difference operation, instructions are further executed in a two stage pipeline of multiplication and addition. The process (addition) of this rear stage is referred to as an instruction execution 2 (E2) stage 406. Thus, multiplication and addition are carried out in a two stage pipeline and, therefore, a series of product-sum/product-difference operations can be executed according to a throughput of once/one clock cycle.

Fetching of an instruction and management of instruction queue 112 are primarily carried out in IF stage 401. The parts with respect to instruction fetch address management of instruction fetch unit 102, internal instruction memory 103, external bus interface unit 106 and PC unit 118, as well as the parts for carrying out IF stage control of control unit 111, instruction fetch control, control of PC unit 118 and the like operate according to the control of the above IF stage 401. IF stage 401 is initialized at the time of execution of a jump in E stage 403.

In IF stage 401, control unit 111 outputs an instruction fetch request to instruction fetch unit 102 in the case that there is a vacancy in instruction queue 112. Instruction fetch unit 102 fetches instruction data in response to the value of the instruction fetch address transferred from PC unit 118.

Instruction fetch unit 102 fetches instruction data from internal instruction memory 103 in the case that the corresponding instruction data is in internal instruction memory 103. In this case fetching of instruction data of 32 bits is completed in one clock cycle.

In the case that the corresponding instruction data is not in internal instruction memory 103, instruction fetch unit 102 outputs an instruction fetch request to external bus interface unit 106. External bus interface unit 106 arbitrates between this instruction fetch request and a request from operand access unit 104 and fetches instruction data from an external memory when fetching of instructions become possible and, then, outputs the instruction data to instruction fetch unit 102. External bus interface unit 106 can access an external memory in a two clock cycle at a minimum. Instruction fetch unit 102 outputs the fetched instruction to instruction queue 112. The instruction data fetched into instruction queue 112 is sequentially outputted to instruction decode unit 113.

In D stage 402, instruction decode unit 113 analyzes the operation code and generates a group of control signals for controlling the parts relating to the executions of the instructions, such as first operation unit 116, second operation unit 117, PC unit 118 and the like. D stage 402 is initialized at the time of execution of a jump in E stage 403. In D stage 402, the system is shifted to an idling cycle and waits by until an effective instruction code is transferred in the case that an invalid instruction code is transferred from instruction queue 112.

In the case that E stage 403 cannot start the next process, instruction decoder 113 nullifies control signals outputted to an arithmetic unit and the like and waits until the completion of processing of the preceding instruction in E stage 403. In the case that the instruction during the execution in E stage 403 is, for example, an instruction for carrying out memory access and a memory access is carried out in M stage 404 at that time, processing of the preceding instruction in E stage 403 is made to wait so as to become of such a condition.

In addition, in D stage 402, division of two instructions that are sequentially executed and a sequential control of two cycle execution instructions are also carried out. Furthermore, in D stage 402, interference check of a load operand using a score board register (not shown) and interference check of an arithmetic unit in second operation unit 117 are also carried out and, in the case that an interference is detected, issuing of processing commands are restricted until the interference is resolved.

In the case that there is an operation instruction to refer to a loaded operand immediately after a load instruction of a word or two words, the start of execution of the operation instruction is delayed until the loading to a register is completed. In this case, even when the memory access is completed in one clock cycle, a stall of one clock cycle occurs. In the case that byte data is loaded, write-in to register file 115 is completed in W stage 405 which is an additional stage and, therefore, the stall period is expanded by additional one cycle.

In addition, in the case that there is a rounding process utilizing an adder immediately after the product-sum operation instruction, instruction decode unit 113 delays the start of execution of the rounding instruction until the operation of the preceding product-sum operation instruction is completed. In this case, a stall of one clock cycle occurs. In the case that product-sum operation instructions are in series, a stall does not occur.

Almost all processes concerning instruction processing except memory accesses and addition and subtraction processing of product-sum/product-difference operation instructions, such as transfers between registers, including operation, comparison and control registers, operand address calculations of load/store instructions, calculations of jump destination addresses of jump instructions, jump processing, EIT (exception, interruption and trap) detections, jump to the vector address of each EIT and the like are carried out in E stage 403.

E stage 403 becomes of the idle condition unless a processing command is issued from D stage 402. In the case that the instruction being processed in E stage 403 is the instruction for carrying out an operand access and that a memory cell access is not completed in M stage 404, processing in E stage 403 is made to wait for completion.

In E stage 403 first operation unit 116 carries out arithmetic operations, logic operations, comparison, transfer, calculation of the addresses of memory operands or addresses of branches. In E stage 403, a general purpose register within register file 115, a control register within first operation unit 116 or within PC unit 118, values of expansion data such as immediate data and displacement fetched from instruction decode unit 113 are read-out as source operands.

At the time of the execution of operation instructions, operations including transfers are carried out in the ALU within first operation unit 116. In the case that the destination operand is a general purpose register or a control register, the operation result in the ALU is written into register file 115 or into the control register within first operation unit 116 or within PC unit 118.

In the case of a load/store instruction, first operation unit 116 transfers the operation result (address value) to operand access unit 104. In the case of a jump instruction, first operation unit 116 transfers the jump address to PC unit 118. In addition, in the case of a store instruction, first operation unit 116 aligns the store data read out from the register file 115 and holds the value thereof.

In addition, in E stage 403 the update of the PC value independent of the instruction to be executed is also carried out. PC unit 118 carries out management of the PC value of the instruction being executed as well as generation of the address of the instruction to be carried out next. In E stage 403, in the case that a jump occurs, first operation unit 116 transfers the jump address to PC unit 118 and initialization is carried out. In the case that executions of short instructions are sequentially carried out, an incrementor (not shown) within PC unit 118 increments the PC value by 1 whenever processing of a 32 bit instruction is started.

In E stage 403, second operation unit 117 carries out all of the operation processes, except for addition of product-sum operations such as arithmetic operations, logic operations, comparison, transfer, shift and the like. Second operation unit 117 reads out values held in register file 115 and the accumulator as the values of operands as well as immediate data sliced by second decoder 123, and carries out the operation designated by this value in an arithmetic unit within second operation unit 117. Then, the operation result is written into register file 115 or to the accumulator.

In E stage 403, update control of the flag value in the PSW according to the operation result in first operation unit 116 or in second operation unit 117 is carried out. In addition, E stage 403 holds an operation control signal for executing addition/subtraction in the product-sum/product-difference operation generated by second decoder 123. Memory access information and load register information are transferred to M stage 404. Here, the stage control of E stage 403 is carried out by control unit 111.

M stage 404 carries out access of an operand using the address transferred from first operation unit 116 in response to an operand access request from control unit 111. In the case that the operand is in internal data memory 105 or in an I/O within a chip (not shown), operand access unit 104 carries out read-out or write-in of an operand from or to internal data memory 105 or to the I/O within the chip once per clock cycle.

In the case that an operand is not in internal data memory 105 or in the I/O within the chip, a data access request is outputted to external bus interface 106. External bus interface unit 106 carries out data access on an external memory upon receiving the data access request.

In the case of load, operand access unit 104 transfers data read out by external bus interface unit 106 via a bus. In the case of byte data, the data is transferred to first operation unit 116. In addition, in the case of word or two word data, data is directly written into register file 115.

In the case of store, operand access unit 104 receives aligned store data from first operation unit 116 and writes the data into an external memory that becomes an object via external bus interface unit 106. Address generation and access control of the access of the latter half at the time of non-alignment access are carried out in M stage 404.

In the case of loading of byte data, the load operand (byte) held within first operation unit 116 is aligned and undergoes zero/sign expansion in W stage 405 and, after that, is written into register file 115.

In E2 stage 406, addition processing or subtraction processing of product-sum/product-difference operations is carried out and the addition result or the subtraction result is written back into the accumulator The data processor according to the present embodiment carries out internal control based on the input clock and, in the fastest case, each pipeline stage completes processing in one clock cycle. Here, the clock control is not directly related to the present embodiment and, therefore, detailed descriptions are omitted.

Next, an example of processing of each subinstruction is described. Operation instructions such as addition/subtraction, logic operations, comparison and transfer instructions between registers complete processing in the three stages of IF stage 401, D stage 402 and E stage 403. Operations and data transfers are carried out in E stage 403.

Product-sum/product-difference instructions are executed for the operation in the two clock cycles of multiplication processing in E stage 403 and of addition/subtraction processing in E2 stage 406. Accordingly, processing is completed in the four stages of IF stage 401, D stage 402, E stage 403 and E2 stage 406.

Byte load instructions complete processing in the five stages of IF stage 401, D stage 402, E stage 403, M stage 404 and W stage 405. Word/two word load instructions and store instructions complete processing in the four stages of IF stage 401, D stage 402, E stage 403 and M stage 404.

In the case of non-aligned access, operand access unit 104 carries out two accesses for carrying out memory access in M stage 404. In E stage 403, processing is completed in one clock cycle. In instructions that require two cycles for execution, first instruction decoder 122 or second instruction decoder 123 generates and outputs an execution control signal for each cycle so that first operation unit 116 or second operation unit 117 carries out operation execution in two cycles.

As described above, one 32 bit instruction is formed of one long instruction and execution of the 32 bit instruction is completed by processing this one long instruction.

In the case that two short instructions are executed in parallel, the speed is determined by the process of the instruction that has a greater process cycle, between the two short instructions. For example, in the case of a combination of an instruction executed in two cycles and an instruction carried out in one cycle, the execution of these two short instructions requires two cycles.

In the case that two short instructions are sequentially executed, the process cycle is determined by a combination of the respective subinstructions. That is to say, the respective instructions are sequentially decoded at the decode stage so that the respective instructions are sequentially executed. For example, in the case of two addition instructions of which execution is completed in one cycle in E stage 403, D stage 402 and E stage 403, respectively, complete processing of each instruction in one cycle, with a total of two cycles. Decoding of the succeeding instruction in D stage 402 is carried out parallel to execution of the preceding instruction in E stage 403.

Next, operation modification instructions carried out by the data processor according to the first embodiment of the present invention are described in detail. FIGS. 11 to 14 are diagrams for describing bit allocations of the operation modification instructions.

A MOD_SAT instruction, shown in FIG. 11, is an instruction that can be utilized only in parallel execution and is an instruction indicating that saturation of 16 bits is carried out with respect to the operation of the other instruction executed in parallel.

A MOD_SATB instruction, shown in FIG. 12, is an instruction that can be utilized only in parallel execution in the same manner as the MOD_SAT instruction shown in FIG. 11 and is an instruction indicating that saturation of eight bits is carried out with respect to the operation of the other instruction executed in parallel.

A MOD_SATN instruction, shown in FIG. 13, is an instruction indicating that saturation is carried out with respect to the operation of the next instruction. This is utilized in the case wherein saturation is carried out with respect to a subinstruction in the long format or with respect to two subinstructions in the short format executed in parallel.

A MOD_SATS instruction, shown in FIG. 14, is an instruction indicating that saturation is carried out with respect to the operation of the other instruction executed in parallel and of the next instruction.

These operation modification instructions are NOP instructions that do not carry out processing by themselves. In addition, the operation modification instructions can be placed in either left container 52 or right container 53.

FIG. 15 is a diagram for describing bit allocation of an ADD instruction for carrying out 16 bit addition between registers. When this ADD instruction is executed, the value of the register designated by Rsrc is added to the value of the register designated by Rdest and the result of the addition is written back into the register designated by Rdest. This addition instruction can be executed alone. In this case, saturation is not carried out.

Figure 16:
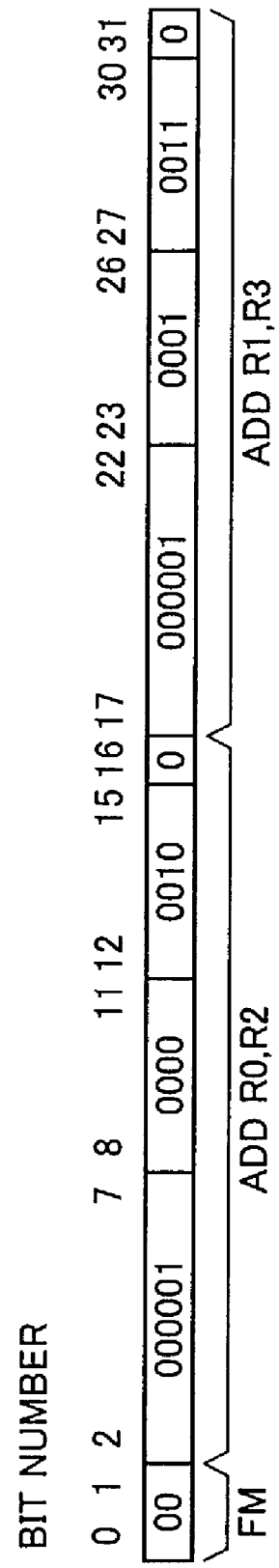
FIG. 16 is a diagram showing a 32 bit instruction in the case that two ADD instructions are carried out in parallel.

FIG. 16 is a diagram showing a 32 bit-instruction in the case that two ADD instructions are executed in parallel. "ADD R0, R2" is executed by first operation unit 116 and "ADD R1, R3" is executed by second operation unit 117. In the case that this 32 bit-instruction is executed alone, saturation is not carried out.

FIGS. 17 and 18 are diagrams showing the register values and the values of saturation (S) flags before and after execution in the case that "ADD R0, R2" is executed alone. Here, "0x" indicates that the following portion is represented by a hexadecimal number. FIG. 17 shows the case that a 16 bit number with a sign is added and an overflow occurs as an example. A saturation process is not carried out, however, and the result of the operation of the addition as 16 bits is written into register R0 as it is. At this time, the S flag does not change.

FIG. 18 shows the case that a 16 bit number with a sign is added and an underflow occurs as an example. In this case, also, a saturation process is not carried out and the result of the operation of the addition as 16 bits is written into register R0 as it is. At this time, also, the S flag does not change.

Figure 19:
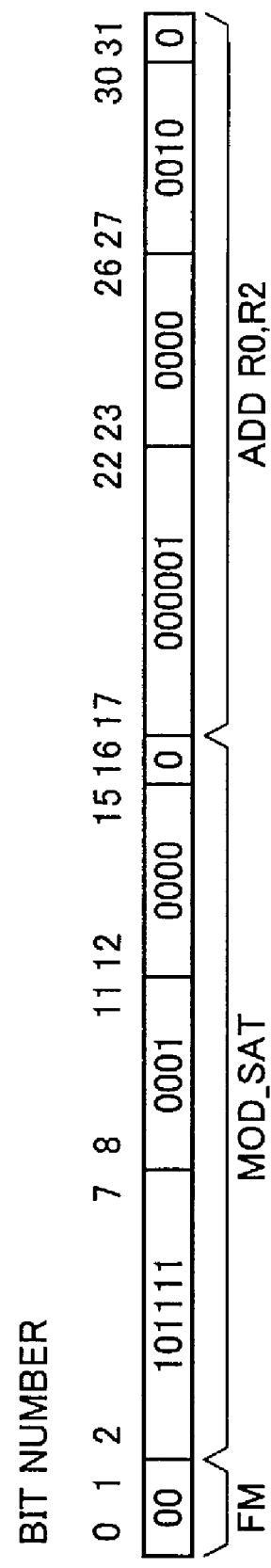
FIG. 19 is a diagram showing a 32 bit instruction in the case that an ADD instruction is executed in parallel with a MOD_SAT.

FIG. 19 is a diagram showing a 32 bit instruction in the case that an ADD instruction is executed parallel to a MOD_SAT instruction. The MOD_SAT instruction is placed in left container 52 while the ADD instruction is placed in right container 53. Instruction decode unit 113 decodes two instructions in parallel. First decoder 122 decodes the MOD_SAT instruction and generates no operation information so as not to carry out an effective process as execution control information, which is outputted to first operation unit 116, or the like. First decoder 122 outputs information indicating that the content of the operation is modified so that a saturation of 16 bits is carried out with respect to the instruction that is being decoded by second decoder 123, to second decoder 123 via a signal line 127.

Second decoder 123 decodes an ADD instruction and generates operation control information for carrying out an addition process, which is outputted to register file 115 and to second operation unit 117. At this time, in the case that signal line 127 indicates that the content of the operation is modified so that a saturation of 16 bits is carried out, second decoder 123 generates a control signal for carrying out the saturation and output the same to second operation unit 117, or the like.

Figure 20:
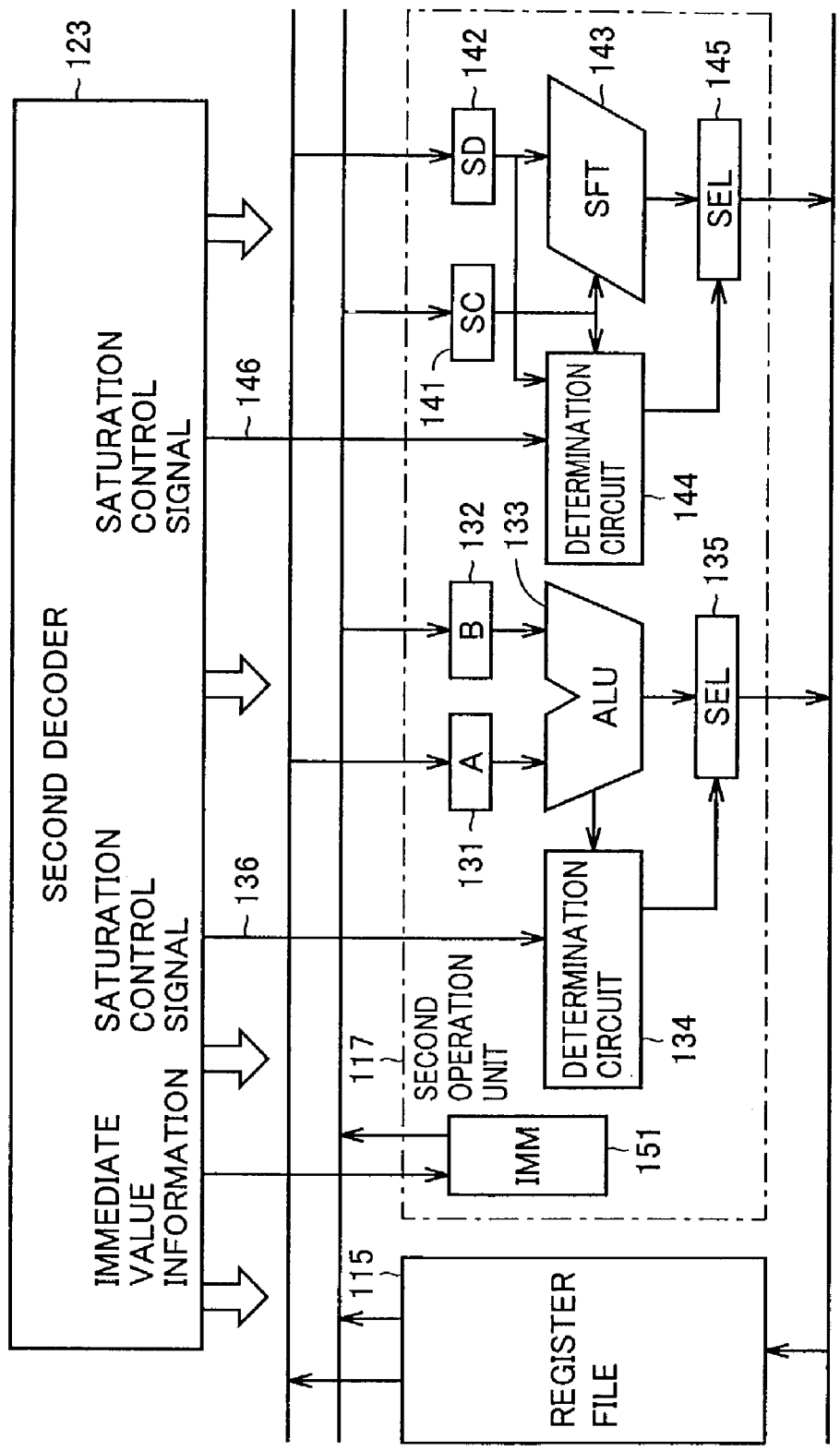
FIG. 20 is a block diagram showing configurations of an ALU and a shifter and of its peripheral circuit within second operation unit 117.

FIG. 20 is a block diagram showing configurations of the ALU, of the shifter and of the peripheral circuit thereof within second operation unit 117. Here, though second operation unit 117 is provided with many other arithmetic units, the parts that do not directly relate to the present invention are omitted.

Second operation unit 117 includes latches A131 and B132 for ALU operations, an ALU 133, an overflow determination circuit 134 for ALU operations, a selector 135 for selecting the output of ALU 133, a shift amount input latch SC141, a shift data input latch SD142, a shifter 143, an overflow determination circuit 144 for shift operations, a selector 145 for selecting the output of shifter 143 and immediate unit (IMM) 151.

The immediate unit 151 fetches immediate data sliced out from an instruction code, carries out a sign/zero expansion on the immediate data and prepares bit mask data for bit operations.

Next, the operation of second operation unit 117, in the case that the instruction shown in FIG. 19 is executed, is described in reference to FIG. 20. A MOD_SAT instruction is in the left container 52 and, therefore, first operation unit 116 does not carry out an effective operation. Second operation unit 117 carries out an addition process with saturation.

First, the values of registers R0 and R2 are read out from register file 115 and are transferred to latches A131 and B132, respectively. ALU 133 carries out an addition process on the values held in latches A131 and B132. Since saturation control signal 136 indicates that a saturation of 16 bits is carried out, determination circuit 134 determines whether or not an overflow or an underflow has occurred based on the result of the operation of ALU 133 (carry output information of bit 0 and bit 1, or the like) and outputs the result of the determination as a selection signal of selector 135.

In the case that an overflow is detected, selector 135 outputs the positive maximum value "0x7fff". In addition, in the case that an underflow is detected, selector 135 outputs the negative minimum value "0x8000". In addition, in the case that neither an overflow nor an underflow is detected, selector 135 selects and outputs the output of ALU 133. This output of selector 135 is written back into register R0.

In addition, in the case that an overflow or an underflow is detected, S flag 35 within control unit 111 is set at "1". In the case that neither an overflow nor an underflow is detected, S flag 35 within control unit 111 is cleared to zero. The output of the result of the operation from second operation unit 117 to control unit 111 or the detail of flag control is not necessary for the description of the present invention and, therefore, descriptions thereof are omitted.

FIGS. 21 and 22 are diagrams showing register values and the values of the S flag before and after the operation in the case that the instruction "ADD R0, R2", of which the operation is modified, is executed. FIG. 21 shows the case that a 16 bit number with a sign is added and an overflow occurs as an example. Since a saturation process is carried out, the positive maximum value "0x7fff" is written into register R0 after the execution of the operation. At this time, an overflow occurs and, therefore, the S flag becomes "1".

FIG. 22 shows the case that a 16 bit number with a sign is added and an underflow occurs as an example. In this case, also, a saturation process is carried out and, therefore, the negative minimum value "0x8000" is written into register R0 after the operation. At this time, an underflow occurs and, therefore, the S flag becomes "1".

In the case that an ADD instruction of which the operation is not modified, as shown in FIG. 16, is executed, second decoder 123 receives information indicating that operation modification is not carried out by means of signal line 127 and indicates that saturation is not carried out by means of saturation control signal 136. In this case, selector 135 selects the output of ALU 133 regardless of whether or not an overflow or an underflow has occurred. This addition result is written back into register file 115. In addition, S flag 35 within control unit 111 is not influenced by the execution of this ADD instruction.

Next, the operation of second operation unit 117 in the case that operation modification is carried out on a shift instruction is described. FIG. 23 is a diagram for describing the bit allocation of a left shift instruction SLLI, of which the amount of shift is designated by immediate data of four bits. The value of the register designated by Rdest is shifted to the left by the amount of shift designated by imm4 and is written back into the register designated by Rdest.

In the case that operation modification is not carried out, the value of the shift is written back into a register as it is, regardless of whether or not an overflow or an underflow has occurred. In the case that operation modification is carried out, the determination of an overflow or an underflow is carried out on data including the data that has been shifted out and a saturation process is carried out. In addition, S flag. 35 within control unit 111 is influenced by the execution of the operation.

Figure 24:
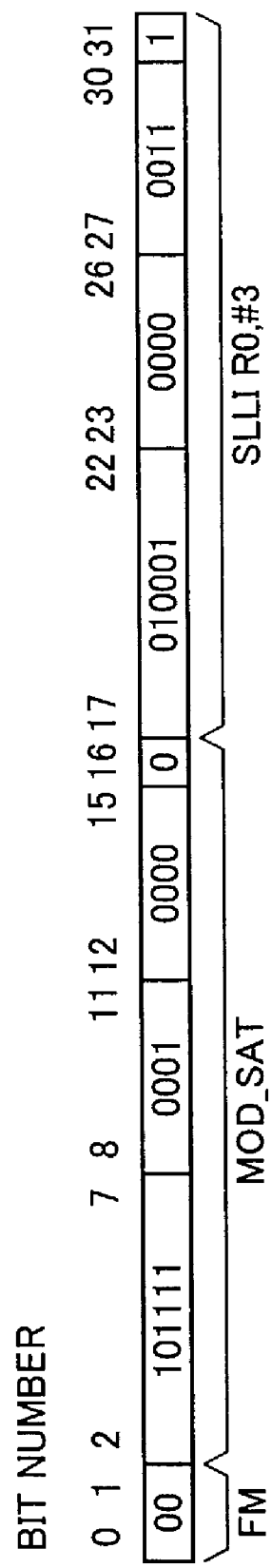
FIG. 24 is a diagram showing a 32 bit instruction in the case that an SLLI instruction is executed parallel to a MOD_SAT.

FIG. 24 is a diagram showing a 32 bit instruction in the case that an SLLI instruction is executed in parallel with a MOD_SAT instruction. A MOD_SAT instruction is placed in left container 52 while an SLLI instruction is placed in right container 53. The method for decoding an instruction is the same as the method described in reference to FIG. 19 except for that the executed instruction is a shift instruction instead of an addition instruction.

Next, the operation of second operation unit 117 in the case that the instruction shown in FIG. 24 is executed is described in reference to FIG. 20. Since a MOD_SAT instruction is in left container 52, first operation unit 116 does not carry out an effective operation. Second operation unit 117 carries out a left shift process with saturation.

First, the value of register R0 is read out from register file 115 and is transferred to latch SD142. In addition, the immediate data sliced out from the instruction code is made to undergo zero expansion by IMM 151 so as to be transferred to latch SC141. Shifter 143 carries out a left shift process in reference to the values held in latches SC141 and SD142 and outputs the result of shift to selector 145.

Since carrying out of saturation is indicated by saturation control signal 146, determination circuit 144 determines whether or not an overflow or an underflow has occurred based on the value inputted into shifter 143 and outputs the result of this determination as a selection signal of selector 145. Determination circuit 144 generates mask data wherein bits have become "1" by the amount of shift toward the LSB side, starting from the second bit on the MSB side of the value (shift data) held in latch SD142 based on the amount of shift held in latch SC141.

Then, an exclusive-or of each of the bits, from the second bit on the MSB side to the LSB of the shift data and a sign bit (value of MSB) is operated, and a logical product of each bit of the result of this calculation and each bit of mask data is operated. As a result, in the case that any of the bits is "1" and the sign of the shift data is positive (MSB is "0"), it is determined that an overflow has occurred. In addition, in the case that any of the bits is "1" and the sign of the shift data is negative (MSB is "1"), it is determined that an underflow has occurred.

In the case that an overflow has been detected, selector 145 outputs the positive maximum value "0x7fff". In addition, in the case that an underflow has been detected, selector 145 outputs the negative minimum value "0x8000". In addition, in the case that neither an overflow nor an underflow has been detected, selector 145 selects and outputs the output of shifter 143. This output of selector 145 is written back into register R0.

In addition, in the case that an overflow or an underflow has been detected, S flag 35 within control unit 111 is set at "1". In the case that neither an overflow nor an underflow has been detected, S flag 35 within control unit 111 is cleared to zero.

Figure 25:
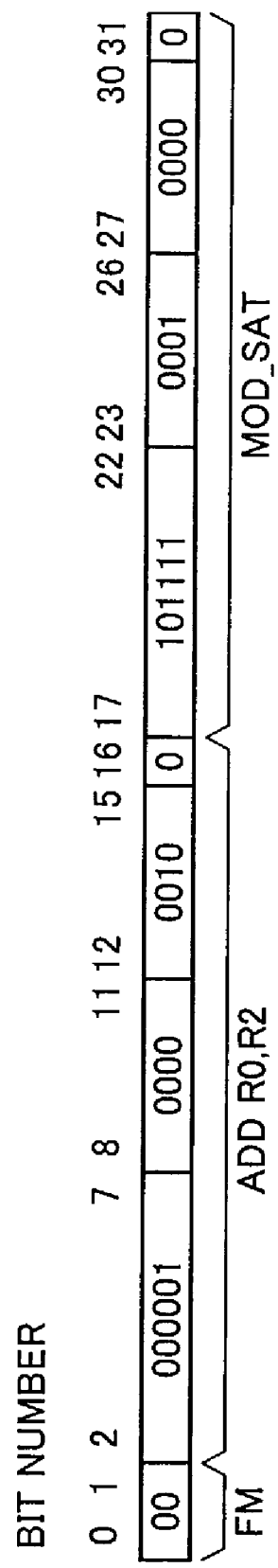
FIG. 25 is a diagram showing a 32 bit instruction in the case wherein an ADD instruction is placed in a left container 52 and a MOD_SAT instruction is placed in a right container 53.

Next, the operation in the case that an operation modification instruction is in right container 53 is described. FIG. 25 is a diagram showing a 32 instruction in the case that an ADD instruction is placed in left container 52 and a MOD_SAT instruction is placed in right container 53. Instruction decode unit 113 decodes two instructions in parallel. Second decoder 123 decodes a MOD_SAT instruction and generates no operation information so as not to carry out an effective process as execution control information, which is outputted to second operation unit 117, or the like. Second decoder 123 outputs, to first decoder 122 via a signal line 128, information indicating to first decoder 122 that first decoder 122 is to modify the content of the operation so that a saturation of 16 bits is carried out on the instruction being decoded.

First decoder 122 decodes an ADD instruction and generates operation control information for carrying out an addition process, which is outputted to register file 115 and first operation unit 116. At this time, in the case that signal line 128 indicates that the content of the operation is to be modified so that saturation is carried out, first decoder 122 generates a control signal for carrying out saturation, which is outputted to first operation unit 116, or the like.

Figure 26:
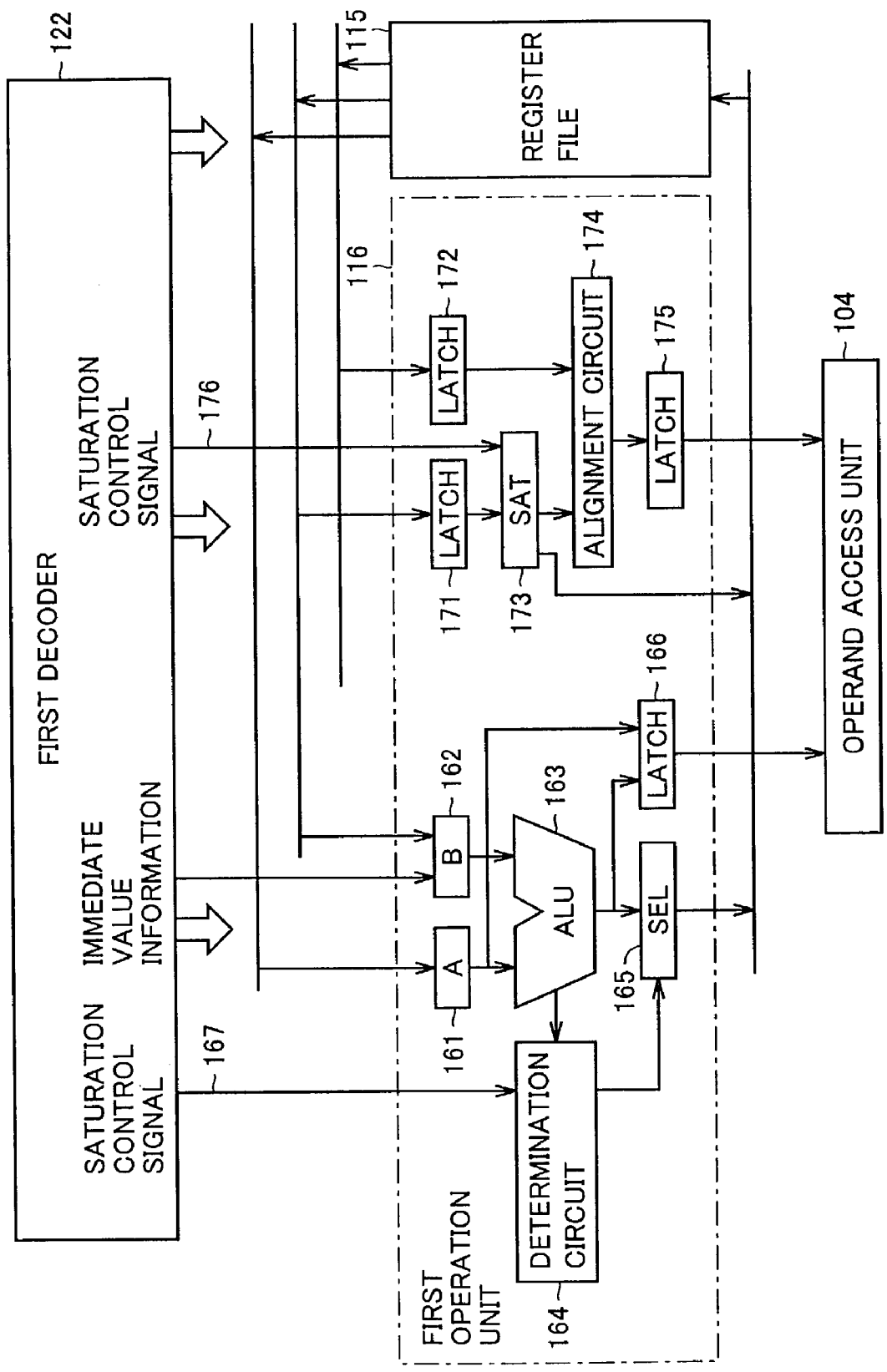
FIG. 26 is a block diagram showing configurations of an ALU and an alignment circuit and of its peripheral circuit within first operation unit 116.

FIG. 26 is a block diagram showing configurations of an ALU and of an alignment circuit as well as of its peripheral circuit within first operation unit 116. Here, though first operation unit 116 is provided with many other arithmetic units, the parts that do not directly relate to the present invention are omitted.

First operation unit 116 includes latches A161 and B162 for ALU operations, an ALU 163, an overflow determination circuit 164 for ALU operations, a selector 165 for selecting the output of ALU 163, a latch 166 for holding an address, latches 171, 172 and 175 for alignment, a saturation (SAT) circuit 173 and an alignment circuit 174.

ALU 163 and its peripheral circuits 161, 162, 164 and 165 are the same as ALU 133 and its peripheral circuits 131, 132, 134 and 135 within second operation unit 117 shown in FIG. 20 and, therefore, detailed descriptions thereof are not repeated. Here, latch 166 holds and outputs an address.

In the case that the instruction shown in FIG. 25 is executed, a MOD_SAT instruction is in right container 53 and, therefore, second operation unit 117 does not carry out an effective operation. First operation unit 116 carries out an addition process with saturation. Here, the operation in the case that the instruction shown in FIG. 25 is executed is the same as the operation in the case that the instruction shown in FIG. 19 is executed and, therefore, detailed descriptions thereof are not repeated.

FIG. 27 is a diagram showing instruction bit allocation of a byte store (STB) instruction in a register indirect mode. When this STB instruction is executed, the lower eight bits in the value of the register designated by Rsrc1 are stored in the address indicated by the value of the register designated by Rsrc2.

Figure 28:
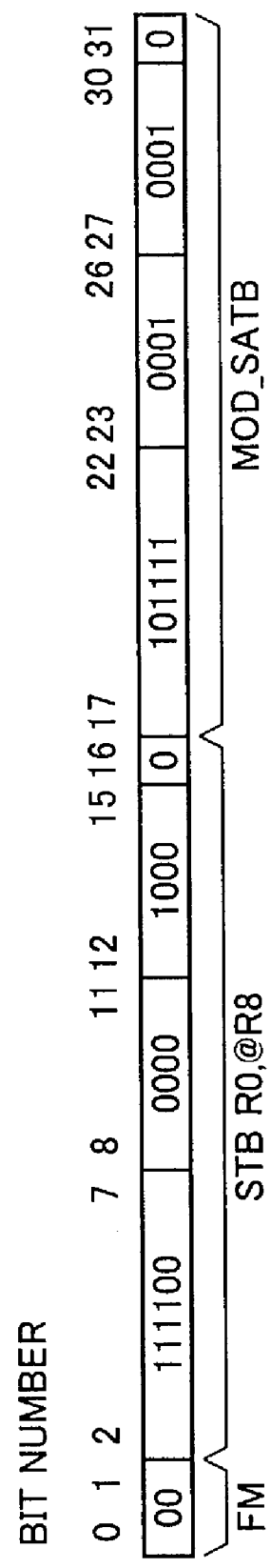
FIG. 28 is a diagram showing a 32 bit instruction in the case that an STB instruction is executed parallel to a MOD_SATB instruction.

FIG. 28 is a diagram showing a 32 bit instruction in the case that an STB instruction is executed in parallel with a MOD_SATB instruction. An STB instruction is placed in left container 52 and a MOD_SATB instruction is placed in right container 53. Instruction decode unit 113 decodes two instructions in parallel. Second decoder 123 decodes the MOD_SATB instruction and generates no operation information so as not to carry out an effective process as execution control information, which is outputted to second operation unit 117. Second decoder 123 outputs, to first decoder 122 via signal line 128, information indicating to first decoder 122 that first decoder 122 is to modify the content of the operation so that a saturation of eight bits is carried out on the instruction being decoded.

Next, the operation of first operation unit 116 in the case that the instruction shown in FIG. 28 is executed is described in reference to FIG. 26. Since a MOD_SATB instruction is in right container 53, second operation unit 117 does not carry out an effective operation. First operation unit 116 carries out a store process with saturation.

First, the value of register R0 (store data) is read out from register file 115 and is transferred to latch 171. Since the carrying out of saturation of eight bits is indicated by saturation control signal 176, saturation circuit 173 receives 16 bit data as input and carries out saturation to obtain a value that can be represented by eight bits. That is to say, values no less than "0x007f" are clipped to "0x007f" while values no greater than "0xff80" and clipped to "0xff80" and are, then, outputted. Here, in the case that saturation is not carried out, the values that have been inputted are outputted as it is.

Alignment circuit 174 carries out alignment based on the address held in latch A161. This alignment value is held value latch 175 and is outputted to operand access unit 104. In addition, as for the operand address, the value of register R8 within register file 115 is held in latch A161 and is outputted to operand access unit 104 via latch 166. Operand access unit 104 stores the operand held in latch 175 in the operand address held in latch 166.

Next, a case is described wherein the instruction for transfer between registers "MV Rdest, Rsrc" held in left container 52 and a MOD_SATB instruction held in right container 53 are executed in parallel. In the case that an MV instruction is executed, the value of the register designated by Rsrc in first operation unit 116 is transferred to latch 171. Saturation circuit 173 carries out saturation on the value held in latch 171 so that this value is written back into the register designated by Rdest within register file 115. Thus, it is possible to carry out saturation on 16 bit data to obtain eight bit data.

Figure 29:
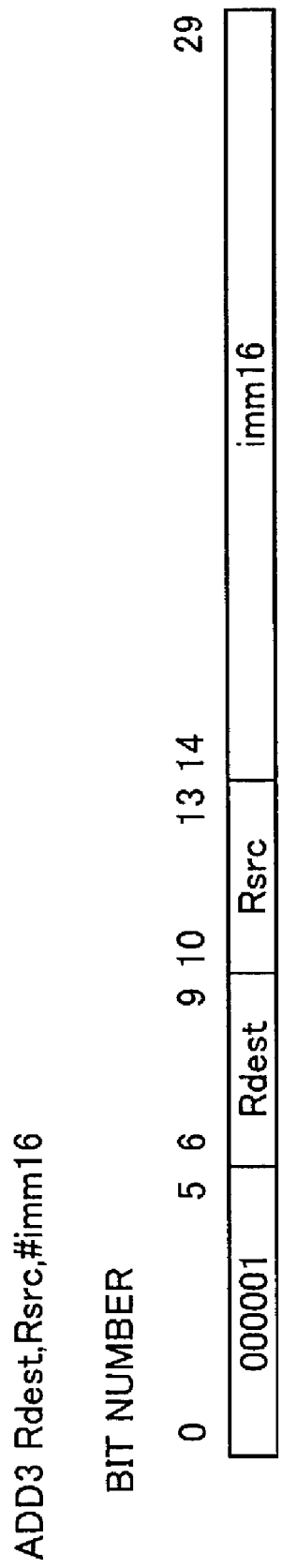
FIG. 29 is a diagram showing instruction bit allocation of a three operand addition (ADD3) instruction for carrying out an addition of immediate data.

Next, the operation of a MOD_SATN instruction for modifying the operation of the next instruction is described. FIG. 29 is a diagram showing instruction bit allocation of a three operand addition (ADD3) instruction for carrying out addition of immediate data. When this ADD3 instruction is executed, the value of the register designated by Rsrc and immediate data of 16 bits designated by imm16 are added and this addition result is written back into the register designated by Rdest.

Figure 30:
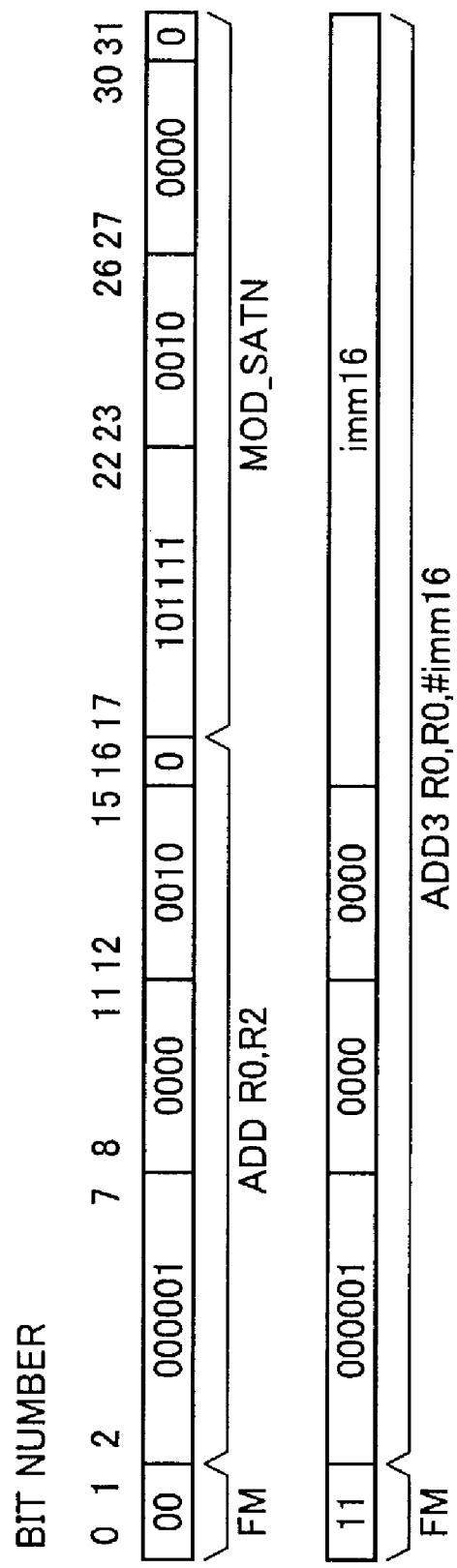
FIG. 30 is a diagram showing one example of a case wherein the operation of an ADD instruction in a long format is modified.

Since this ADD3 instruction is an instruction in the long format, a MOD_SAT instruction cannot be utilized. FIG. 30 is a diagram showing an example of the case wherein the operation of an ADD instruction in the long format is modified. As shown in FIG. 30, in the case that the operation of an ADD3 instruction is modified, the ADD3 instruction is executed immediately after the execution of the MOD_SATN instruction.

Since the MOD_SATN instruction is stored in right container 53, the MOD_SATN instruction is decoded by second decoder 123. The MOD_SATN instruction, itself, is an NOP instruction that does not carry out an effective operation. When second decoder 123 decodes a MOD_SATN instruction, it outputs information indicating that the operation of the next instruction is to be modified to D stage control unit 126. D stage control unit 126 holds this information until the next instruction is decoded and outputs this information to first decoder 122 and second decoder 123 at the time when the next instruction is decoded.

First decoder 122 decodes an ADD3 instruction and, at this time, an operation control signal indicating that saturation also is to be carried out is generated in accordance with information indicating modification of the operation of the next instruction outputted from D stage control unit 126 and is outputted to first operation unit 116. First operation unit 116 receives this operation control signal and carries out an addition process with saturation.

First, the value of register R0 within register file 115 is transferred to latch A161 and the immediate value outputted from first decoder 122 is transferred to latch B162. ALU 163 adds the values held in latches A161 and B162 and writes back the result of this operation to R0 within register file 115 via selector 165 after the saturation process has been carried out.

Figure 31:
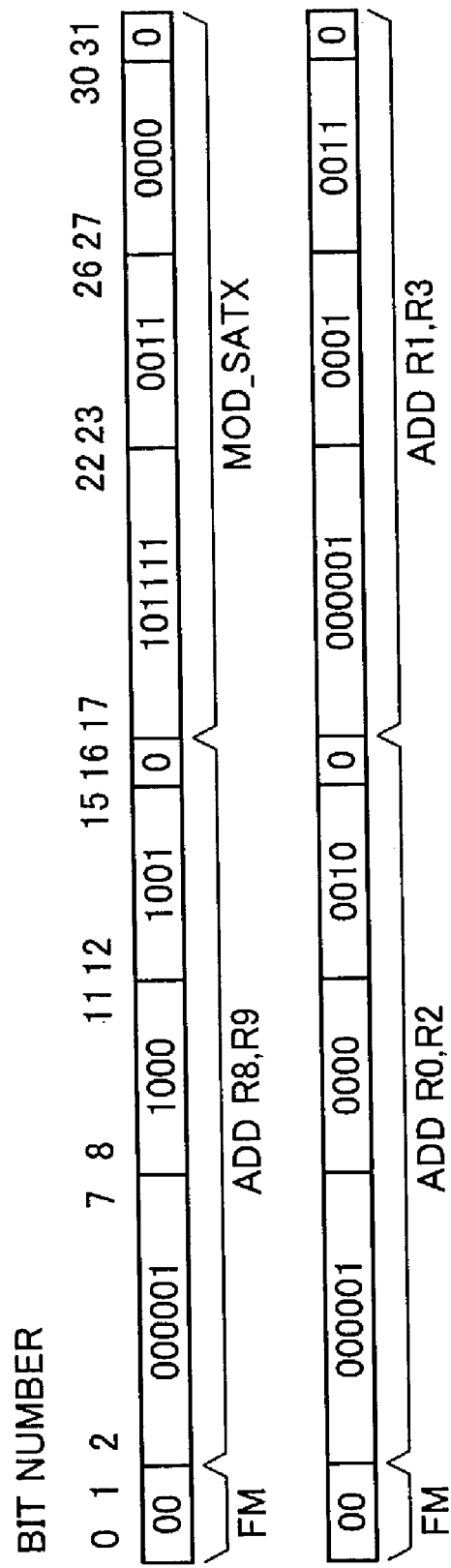
FIG. 31 is a diagram showing one example of a method for utilizing a MOD_SATX instruction.

Next, a MOD_SATX instruction for modifying the operations of the instructions to be executed in parallel and of the instructions to be executed next is described. FIG. 31 is a diagram showing one example of a method for utilizing a MOD_SATX instruction. When this MOD_SATX instruction is decoded, the MOD_SAT instruction and the MOD_SATN instruction are, both, processed. Accordingly, the instruction "ADD R8, R9" to be executed in parallel with the MOD_SATX instruction and the instructions "ADD R0, R2" and "ADD R1, R3" to be executed next are executed with saturation.

A case wherein saturation is carried out as an operation modification instruction is described above. In many cases of image processing, byte data is handled. Therefore, the data processor according to the present embodiment is provided with an SIMD (single instruction multiple data stream) operation function with respect to two pieces of byte data. In the following, a case is described wherein an SIMD operation is carried out as an operation modification instruction.

FIG. 32 shows a MOD_2B instruction indicating that two operations of eight bits are carried out in parallel with respect to the operation of a pair of instructions carried out in parallel which is an instruction solely allowing parallel execution. The MOD_2B instruction, itself, does not carry out an operation process (NOP). The MOD_2B instruction can be placed in either left container 52 or the right container.

Figure 33:
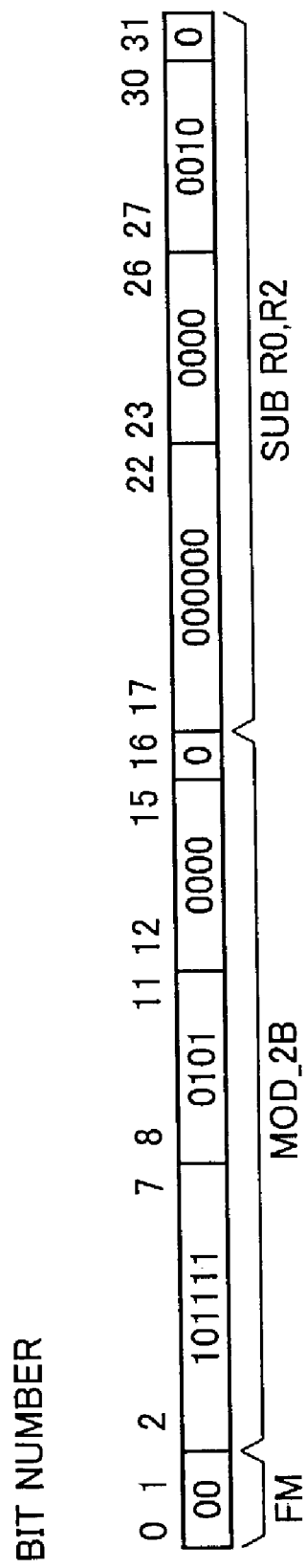
FIG. 33 is a diagram showing one example in the case wherein a SUB instruction is executed parallel to a MOD_2B instruction.

FIG. 33 is a diagram showing an example of a case wherein a SUB instruction is executed in parallel with a MOD_2B instruction. The "SUB R0, R2" instruction is an instruction for subtracting the value of R2 from the value of R0 and for writing back the result into R2. The MOD_2B instruction is placed in left container 52 while the SUB instruction is placed in right container 53 so that the two instructions decoded in parallel in instruction decode unit 113 shown in FIG. 9. The MOD_2B instruction is decoded in first decoder 122 and generates no operation information so as not to carry out an effective process as execution control information to be transferred to first operation unit 116, which is outputted to first operation unit 116, or the like.

In addition, information indicating that the content of the operation is to be modified with respect to the instruction being decoded in second decoder 123 so as to carry out two byte operations is sent from first decoder 122 to second decoder 123 via signal line 127. The SUB instruction is decoded in second decoder 123 and operation control information for carrying out a subtraction process is generated and is outputted to register file 115 and to second operation unit 117. At this time, in the case that signal line 127 indicates that the content of operation is to be modified so as to carry out two byte operations, a control signal for carrying out two byte operations is generated and is outputted.

Figure 34:
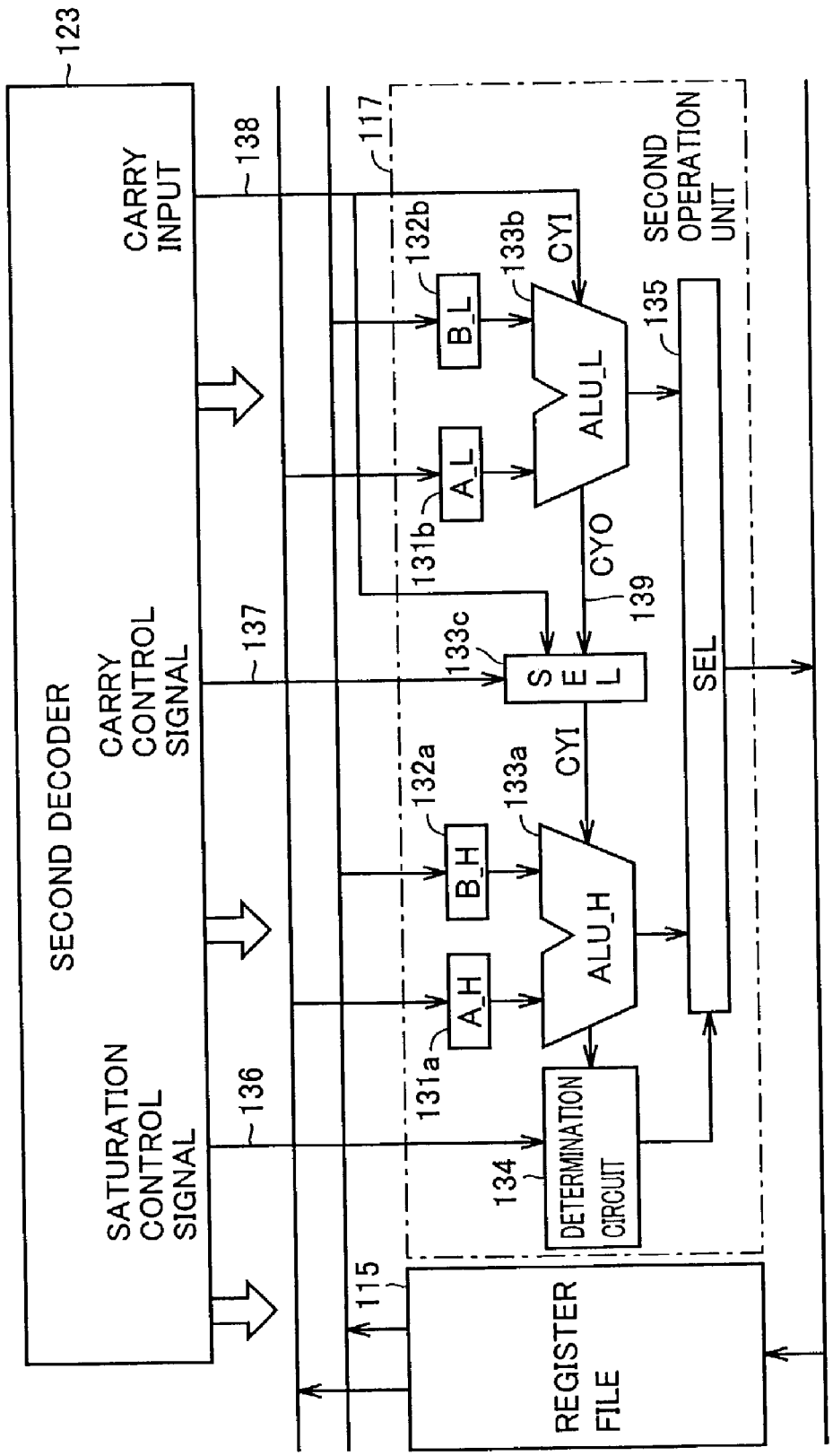
FIG. 34 is a diagram showing, in detail, a block configuration of ALU 133 within second operation unit 117 and of its periphery for describing an SIMD process of two byte operations.

FIG. 34 is a detailed diagram showing the block configuration around ALU 133 within second operation unit 117 describing an SIMD process of two byte operations. It has a function wherein the upper eight bits and the lower eight bits can independently be operated on arithmetically. In FIG. 34, the same reference symbols are attached to the parts having the same configurations and functions as in FIG. 20. Here, though many other control signals exist in second operation unit 117, the parts that do not directly relate to the present invention are omitted.

Second operation unit 117 includes latches 131a and 132a for the ALU of the upper eight bits, latches 131b and 132b for the ALU of the lower eight bits, an ALU_H 133a that is an ALU portion of the upper eight bits, an ALU_L 133b that is an ALU portion of the lower eight bits, a selector 133c for selecting a carry input to ALU_H 133a, an overflow determination circuit 134 for ALU operations and a selector 135 for selecting the outputs of ALU_H 133a and ALU_L 133b.

The operation of second operation unit 117 in the case that the instruction shown in FIG. 33 is executed is described in reference to FIG. 34. In the case that an SIMD operation of two pieces of byte data is carried out, the data processor according to the present embodiment carries out a process wherein it is assumed that the byte data of the respective process object is stored in the upper eight bits and in the lower eight bits of one 16 bit register.

First operation unit 116 does not carry out an effective operation because a MOD_2B instruction is in left container 52 of first operation unit 116. Second operation unit 117 carries out two byte (eight bit) subtraction processes. The values of registers R0 and R2, respectively, are read out from register file 115 and the respective upper eight bits are transferred to latch A_H131a and to latch B_H132a while the respective lower eight bits are transferred to A_L131b and to B_L132b.

Subtraction processes in ALU_H 133a and ALU_L 133b are executed by setting carry input CYI at "1" and by adding the inverted value of the value fetched from latch B_H132a or B_L132b to the value fetched from latch A_1H131a or A_L131b. At the time of the execution of the instruction shown in FIG. 33, second decoder 123 sets carry input 138 at "1" and sets carry selection signal 137 at the value wherein selector 133c selects carry input 138.

By exercising control in such a manner, a subtraction process of the upper eight bits is carried out in ALU_H 133a and a subtraction process of the lower eight bits is carried out in ALU_L 133b. The two byte subtraction results are combined and are written back to register R0 within register file 115 via selector 135.

FIG. 35 is a diagram showing an example of the result of the subtraction process of two pieces of byte data. The upper eight bits "0x00-0x01" and the lower eight bits "0x01-0x02", respectively, are calculated and the result of these operations "0xff" (upper eight bits) and "0xff" (lower eight bits) are combined and written back to register R0.

A case is briefly described below wherein the "SUB R0, R2" instruction is solely executed in second operation unit 117. In this case, a subtraction process of 16 bits is carried out. At the time of instruction decoding, information that does not carry out operation modification with signal 127 is transferred to second decoder 123 and the value wherein selector 133c selects carry output CYO 139 from ALU_L 133b with carry selection signal 137 is transferred to selector 139. Other operation control signals are the same in the case wherein two pieces of byte data are operated on. Thus, a subtraction process of 16 bits is executed.

FIG. 36 is a diagram for describing an operation process in the case that a subtraction process of 16 bit data is carried out with the same initial value as in FIG. 35. Unlike in FIG. 35, "0feff", which is the result of the operation of 16 bits, is written back to register R0 as the result of the operation.

Though the data processor according to the present embodiment is provided, in the same manner as of the case of the MOD_SATN instruction and the MOD_SATX instruction for carrying out saturation, with a MOD_2BN instruction for modifying the operation so that two byte operations are carried out with respect to the operation of the next instruction and with a MOD_2BX instruction for modifying the operation so that two byte operations are carried out with respect to instructions executed in parallel and with respect to the instruction executed next as the above described operation modification instructions, the same controls as of the MOD_SATN instruction and of the MOD_SATX instruction are executed with the only difference being in the content of modification of the operation and, therefore, detailed descriptions thereof are not repeated.

The data processor according to the present embodiment is described above and the present invention can, of course, be applied in the case wherein the instruction set, the pipeline configuration, the data bit length and the like differ from those in the present embodiment.

In addition, though a case is described wherein a saturation process and an SIMD operation are carried out as modifications of the operation, it is possible to additionally carry out a variety of other processes. It is possible to apply the present invention in the case of the modification of the content of operations such as, for example, designation of operation size in the case that an operation having a different operation size default is carried out, designation of a rounding mode, designation of the address bit length in the case that there are a plurality of address bit lengths (for example, 16 bit mode and 32 bit mode), designation of an addressing method in the case of modulo addressing, or the like, and designation of a special modification of address and of a special method for updating addresses. In addition, it is possible to update the content of operations while maintaining compatibility by just adding instructions for modifying the operations even in the case of updating the content of operations of instructions implemented in an existent data processor.

In addition, though a data processor of 16 bits is described in the present embodiment, it is possible to apply the present invention in a data processor of 32 bits or 64 bits.

In addition, though a data processor using a VLIW system is described in the present embodiment, it is possible to apply a MOD_SATN instruction or a MOD_2BN instruction for modifying the operation of the next instruction to a data processor for processing an instruction set other than of the VLIW system. In addition, it is possible to further increase the performance by applying super scalar technology to the MOD_SATN instruction, or the like, so that the operation modification instruction and the operation modification object instruction are processed in parallel.

Furthermore, a variable length instruction set may be used so that option designation is handled as a prefix word.

In addition, though a data processor for executing two instructions in parallel is described for the purpose of simplification in the present embodiment, it is possible to apply the present invention in a data processor for executing three, or more, instructions in parallel.

In addition, an addition instruction, a left shift instruction and a store instruction are cited and described as examples of instructions for modifying an operation so as to carry out saturation. It is possible to modify any instruction, such as a sign inversion instruction, an absolute value instruction, an addition and subtraction instruction, a transfer instruction and the like. In addition, though a case of subtraction is cited and described as an example of an SIMD operation, it is possible to modify any instruction, such as other arithmetic operation instructions, including absolute value and multiplication/product sum, a shift instruction and the like.

Furthermore, the data processor may be formed so that modification of a plurality of operations is possible for one instruction.

Though in the present embodiment an application example is cited for a case wherein two pieces of byte data are held in one 16 bit register in the case that an SIMD operation modification is carried out, three, or more, pieces of data may be treated. For example, four byte operations may be carried out for a 32 bit operation.

In addition, hardware may be added so that two, or more, 16 bit operations can be carried out. For example, a bus connected to a 16 bit adder and to a register file may be added so that the result of the addition of the value of R0 and the value of R2 is written back to R0 while the result of the addition of the value of R1 and the value of R3 is written back to R1 in the case that an SIMD operation modification is carried out on "ADD R0, R2". R1 and R3 are registers having numbers obtained by adding "1" to the register numbers of R0 and R2, respectively, and are designated according to predetermined rules instead of in an explicit manner. There is no specific limitation to the type of designation method, so the designation method can be freely determined.

Furthermore, in the case that an SIMD operation modification is applied to operation instructions such as a product sum operation, an absolute value sum operation and the like, a plurality of multipliers, an absolute value calculation circuit and a three input adder may be implemented so that two pairs of operations are carried out for multiplication and an absolute value operation and a three value addition is carried out at the final stage of addition and, thereby, the result of the addition is accumulated in one accumulator or register.

The type of operation and the type of modification carried out on the operation may be freely selected, taking into consideration the target application, frequency of appearance of instructions, cost of added hardware, inspection cost and the like. In addition, the types of combinations of implemented instructions may be selected, taking tradeoffs similar as the above into consideration.

Though modification of an operation is carried out in the instruction decoder according to the present embodiment, modification control of the operation may be carried out at any stage, from the decoding of the instruction to the execution of the instruction.

In addition, though the MOD_SATN instruction modifies the operation, only, of the instruction that is to be executed next in the present embodiment, the number of instructions for modifying the operations may be designated so that one operation modification instruction modifies the operations of many instructions.

As described above, in the data processor according to the present embodiment, an operation modification instruction is implemented and, thereby, it becomes unnecessary to allocate different instruction codes for every instruction having a different operation, the basic instruction length of the instructions can be made short, and it becomes possible to increase the code efficiency. Accordingly, it becomes possible to reduce the product cost of a data processor built into a machine wherein a program is written into a ROM.

In addition, it becomes possible to modify operations of many instructions by combining instructions and, therefore, substantially the same effect as of increasing the number of implemented instructions is obtained and the effect of increase in the performance of the data processor is achieved.

In addition, the operations of many instructions can be modified by implementing only an extremely small number of operation modification instructions and, therefore, it becomes possible to reduce the development cost of a data processor.

In addition, the content of an operation is determined by an instruction code alone according to the present invention, in comparison with the case wherein operation modes are switched by means of mode bits and, therefore, software debugging is easy so that it becomes possible to prevent the incorporation of bugs in software.

Furthermore, in the case that one operation modifies the operations of a plurality of instructions, such as the MOD_SATX instruction or the MOD_2BX instruction, it becomes possible to further increase the code efficiency.

Second Embodiment

A data processor according to the second embodiment of the present invention relates to a data processor provided with an instruction prefix word.

Figure 37:
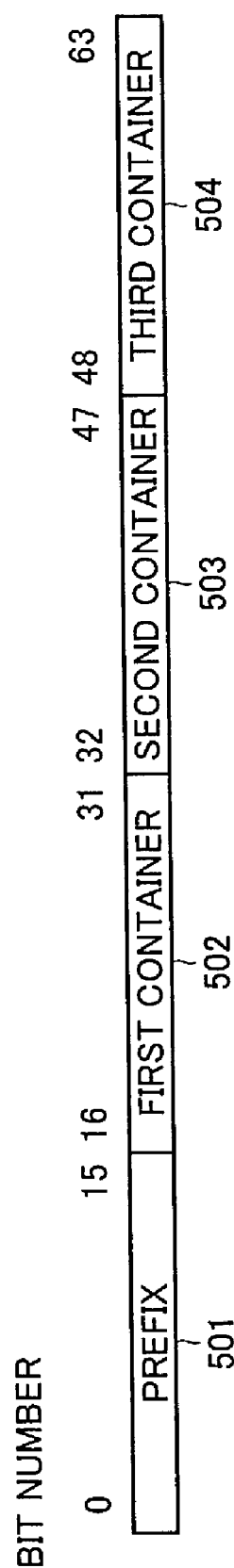
FIG. 37 is a diagram showing a format of a basic instruction executed by a data processor according to the second embodiment of the present invention.

FIG. 37 is a diagram showing a format of the basic instructions executed by the data processor according to the second embodiment of the present invention. This instruction format includes a prefix word 501, a first container 502, a second container 503 and a third container 504. Prefix word 501 designates the length of subinstructions, the number of instructions to be executed in parallel, the execution conditions and the like and, in addition, can modify the content of the operation of the subinstruction stored in each container.

FIG. 38 is a diagram describing, in detail, prefix word 501 shown in FIG. 37. For the purpose of simplification, only the case of the carrying out of saturation is described. It becomes possible to additionally carry out saturation by modifying the operation of the instruction designated in each container in the case that field 511 is "0001".

S1 field 512 designates modification of the operation of the subinstruction in first container 502. S2 field 513 designates modification of the operation of the subinstruction in second container 503. Third field 514 modifies the operation of the subinstruction in third container 504. In the case that these fields 512 to 514 are "0", this indicates that modification of the operations of the subinstructions in the corresponding containers is not carried out. In addition, in the case that fields 512 to 514 are "1", this indicates that modification of the operations of the subinstructions in the corresponding containers is carried out, and saturation processes are additionally carried out.

Figure 39:
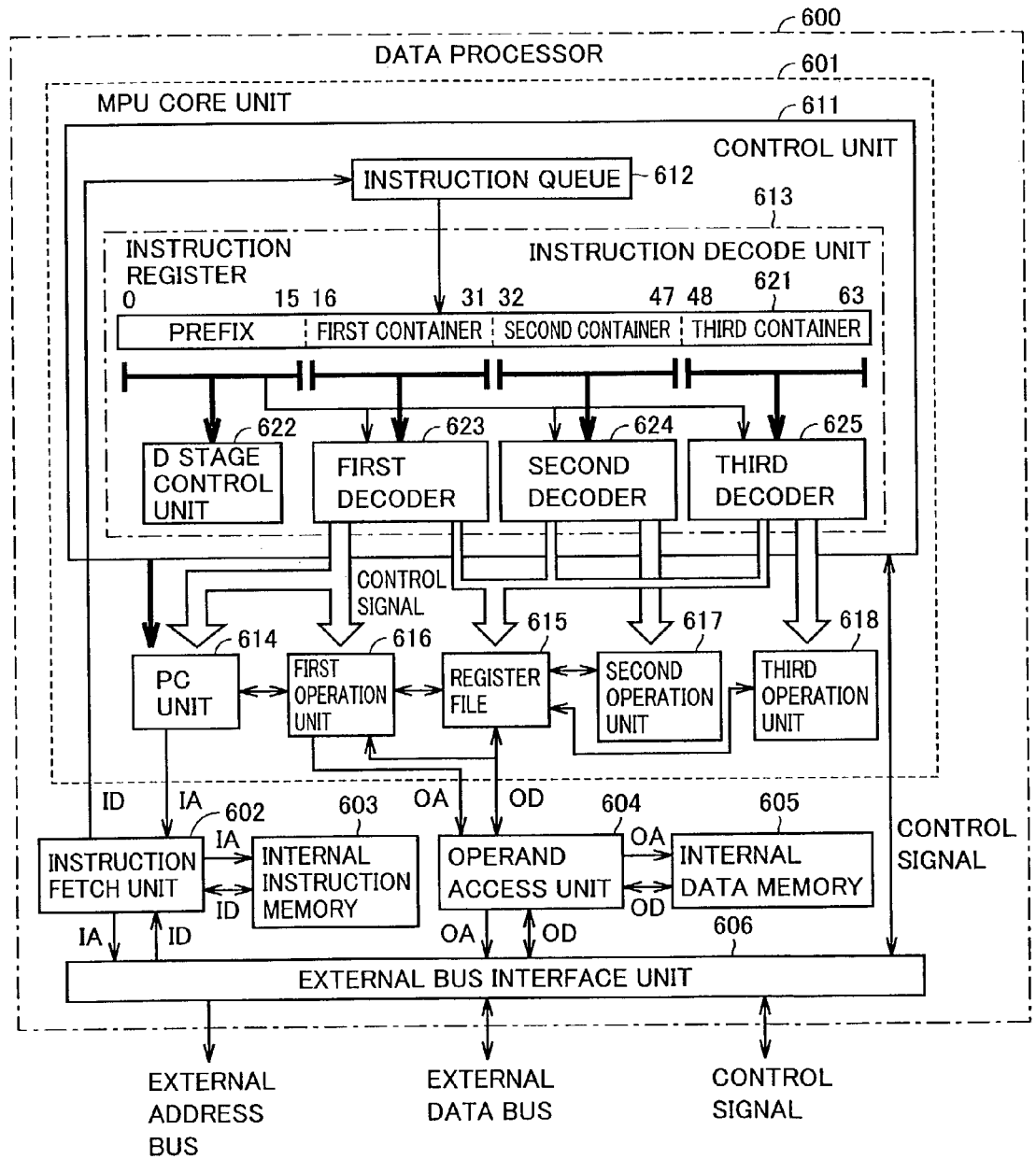
FIG. 39 is a block diagram showing a schematic configuration of the data processor according to the second embodiment of the present invention.

FIG. 39 is a block diagram showing a schematic configuration of the data processor according to the second embodiment of the present invention. This data processor 600 includes an MPU core unit 601, an instruction fetch unit 602 for fetching instruction data in response to a request from MPU core unit 601, an internal instruction memory 603, an operand access unit 604 for accessing operand data in response to a request from MPU core unit 601, an internal data memory 605 and an external bus interface unit 606 for arbitrating requests from instruction fetch unit 602 and from operand access unit 604 as well as for accessing a memory outside of data processor 600.

Here, instruction fetch unit 602, internal instruction memory 603, operand access unit 604, internal data memory 605 and external bus interface unit 606 are the same as instruction fetch unit 102, internal instruction memory 103, operand access unit 104, internal data memory 105 and external bus interface unit 106 and, therefore, detailed descriptions thereof are not repeated.

In addition, MPU core unit 601 includes a control unit 611 for carrying out overall control of MPU core unit 601, a PC unit 614 for controlling the PC value, a register file 615, first operation unit 616, second operation unit 617 and third operation unit 618. Here, PC unit 614, register file 615, first operation unit 616, and second operation unit 617 are the same as PC unit 118, register file 115, first operation unit 116, and second operation unit 117 and, therefore, detailed descriptions thereof are not repeated.

Third operation unit 618 is connected to register file 615 via a plurality of buses and, therefore, can carry out an arithmetic operation in parallel with first operation unit 616, and second operation unit 617.

Control unit 611 includes an instruction queue 612 and an instruction decode unit 613. In addition, instruction decode unit 613 includes instruction register 621 for holding instruction data received from instruction queue 612, a D stage control unit 622, a first decoder 623, a second decoder 624 and a third decoder 625.

Instruction register 621 holds instruction data, which is an object of decoding, received from instruction queue 612. Here, the format of the instruction data held in this instruction register 621 is the same as the instruction format shown in FIG. 37.

Instruction decode unit 613 is provided with three decoders (first decoder 623, second decoder 624 and third decoder 625) for generating an execution control signal and the like, and it is possible to decode three subinstructions in parallel.

First decoder 623 decodes the instruction stored in first container 502 and first operation unit 616 executes the instruction in response to the result of decoding. Second decoder 624 decodes the instruction stored in second container 503 and second operation unit 617 executes the instruction in response to the result of decoding. Third decoder 625 decodes the instruction stored in third container 504 and third operation unit 618 executes the instruction in response to the result of decoding.

A prefix word 501 is primarily decoded in D stage control unit 622 and field 511 within prefix word 501 is also decoded in first to third decoders 623 to 625. In addition, S1 field 512 is decoded in first decoder 623, S2 field 513 is decoded in second decoder 624 and S3 field 514 is decoded in third decoder 625.

In the case that field 511 is "0001" and any of S1 field 512, S2 field 513 and S3 field 514 is "1", an operation and a process with saturation are carried out with respect to the subinstruction stored in the container corresponding to the field that has become "1". Here, D stage control unit 622 carries out the same process as of D stage control unit 126 according to the first embodiment shown in FIG. 9 and, thereby, controls first decoder 623, second decoder 624 and third decoder 625.

Though the second embodiment is described above, the present invention can, of course, be applied even in the case that the instruction set, the pipeline configuration, the data bit length and the like are different from those in the embodiment.

Control may be carried out so that the number of operation codes is variable and the prefix word may be treated as an option so that an instruction encoding method may be adopted wherein the prefix word is not necessarily included.

In addition, the instruction, or the like, affected by the content of modification of the operation, or the operation that becomes an object, may be applied in any case in the same manner as in the first embodiment. In addition, modification of a plurality of operations may be carried out with respect to one instruction.

As described above, prefix word 501 modifies the operation of an instruction in the data processor according to the present embodiment and, therefore, the instruction code length of the basic instruction can be made short, and it has become possible to increase the code efficiency.

In addition, one prefix word 501 can modify the operation of a plurality of instructions and, therefore, even in the case that the operation of a plurality of instructions is modified, this can be implemented with a short instruction length so that it becomes possible to increase the code efficiency. Accordingly, it becomes possible to reduce the product cost of a data processor built into an equipment wherein a program is written into a ROM.

In addition, the content of an operation is determined by an instruction code alone according to the present invention, in comparison with the case wherein operation modes are switched by means of mode bits and, therefore, software debugging is easy so that it becomes possible to prevent the incorporation of bugs in software.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data processor for executing an instruction including a first operation code and a second operation code, comprising:
   an instruction fetch unit fetching an instruction code;
   an instruction decode unit decoding the instruction code fetched by said instruction fetch unit; and
   an instruction execution unit executing the instruction in response to a result of decoding by said instruction decode unit, wherein
   said instruction decode unit includes:
   a first decoder decoding said first operation code; and
   a second decoder decoding said second operation code in parallel to decoding of said first operation code,
   said instruction execution unit includes:
   a first instruction execution unit executing the first operation code in response to a result of decoding by said first decoder; and
   a second instruction execution unit executing the second operation code in response to a result of decoding by said second decoder in parallel to execution of said first operation code, and
   said data processor further comprises a circuit, in the case that said second operation code indicates a modification of a content of an operation indicated by said first operation code, allowing said first instruction execution unit to execute a modified operation indicated by said first operation code, wherein
   said first operation code is capable of specifying an operation independent of said second operation code.

2. The data processor according to claim 1, wherein
   said data processor further comprises a circuit, in the case that said first operation code indicates modification of a content of an operation indicated by said second operation code, allowing said second instruction execution unit to execute the modified operation indicated by said second operation code.

3. A data processor executing an instruction including a plurality of operation codes and an instruction prefix word designated whether or not each of operations indicated by said plurality of operation codes is modified, comprising:
   an instruction fetch unit fetching an instruction code;
   an instruction decode unit decoding the instruction code fetched by said instruction fetch unit; and
   an instruction execution unit executing the instruction in response to a result of decoding by said instruction decode unit, wherein
   said instruction decode unit includes a plurality of decoders for decoding said plurality of operation codes, each of said plurality of decoders decodes a corresponding operation code in parallel to a decoding of another operation code,
   said instruction execution unit includes a plurality of instruction execution units for executing the operations indicated by said plurality of operation codes in response to results of decoding obtained by said plurality of decoders, each of said plurality of instruction execution units executes a corresponding operation code in parallel to an execution of another operation code, and
   said data processor further comprises a circuit determining whether or not a content of each operation designated by a corresponding operation code is to be modified in response to said instruction prefix word and allowing a corresponding instruction execution unit to execute a modified operation indicated by the corresponding operation code, wherein
   each of said plurality of operation codes is capable of specifying an operation independent of another operation code.

4. A data processor comprising:
   an instruction fetch unit fetching an instruction code;
   an instruction decode unit decoding an instruction code fetched by said instruction fetch unit;
   an instruction execution unit executing the instruction in response to a result of decoding by said instruction decode unit; and
   a circuit, in the case that the instruction code indicates a modification of a context of an operation of another instruction code, allowing said instruction execution unit to execute the operation with respect to a plurality of pieces of data designated by said another instruction code,
   wherein said instruction execution unit divides data, which is an object of processing, into a plurality of pieces of data and executes the operation designated by said another instruction code for each of the plurality of divided pieces of data in the case that the instruction code indicates a modification of a content of the operation of said another instruction code.

5. A data processor comprising:
   an instruction fetch unit fetching an instruction code;
   an instruction decode unit decoding an instruction code fetched by said instruction fetch unit;
   an instruction execution unit executing the instruction in response to a result of decoding by said instruction decode unit; and
   a circuit, in the case that the instruction code indicates a modification of a content of an operation of another instruction code, allowing said instruction execution unit to execute the operation with respect to a plurality of pieces of data designated by said another instruction code,
   wherein said instruction execution unit executes the operation designated by said another instruction code for a plurality of data including data designated by said another instruction code and data implicitly designated by said another instruction code based on predetermined rules in the case that the instruction code indicates a modification of the content of the operation of said another instruction code.

* * * * *